United States Patent
Van Wageningen et al.

(10) Patent No.: US 7,801,121 B1
(45) Date of Patent: Sep. 21, 2010

(54) SERIAL COMMUNICATIONS SYSTEMS WITH CYCLIC REDUNDANCY CHECKING

(75) Inventors: Darren Van Wageningen, Kanata (CA); Curt Wortman, Ottawa (CA)

(73) Assignee: Altera Corporation, San Jose, CA (US)

( * ) Notice: Subject to any disclaimer, the term of this patent is extended or adjusted under 35 U.S.C. 154(b) by 1101 days.

(21) Appl. No.: 11/407,484

(22) Filed: Apr. 20, 2006

(51) Int. Cl.
*H04Q 11/00* (2006.01)

(52) U.S. Cl. ...................................... 370/386; 370/242

(58) Field of Classification Search ................. 370/474, 370/229, 468, 445; 709/215, 250, 230; 714/807, 714/758
See application file for complete search history.

(56) References Cited

U.S. PATENT DOCUMENTS

| | | | | |
|---|---|---|---|---|
| 4,739,321 A * | 4/1988 | Friedman et al. | ............ | 370/445 |
| 4,942,574 A * | 7/1990 | Zelle | ......................... | 370/400 |
| 5,218,680 A * | 6/1993 | Farrell et al. | ................ | 709/215 |
| 5,327,421 A * | 7/1994 | Hiller et al. | ............ | 370/395.61 |
| 5,457,681 A * | 10/1995 | Gaddis et al. | ................ | 370/402 |
| 5,530,894 A * | 6/1996 | Farrell et al. | ................ | 709/250 |
| 5,615,211 A * | 3/1997 | Santore et al. | ............. | 370/419 |
| 5,668,810 A * | 9/1997 | Cannella, Jr. | ............... | 370/392 |
| 5,802,080 A * | 9/1998 | Westby | ....................... | 714/807 |
| 6,041,434 A * | 3/2000 | Kamishima | .................. | 714/807 |
| 6,088,337 A * | 7/2000 | Eastmond et al. | ........... | 370/280 |
| 6,331,978 B1 * | 12/2001 | Ravikanth et al. | ........... | 370/392 |
| 6,339,600 B1 * | 1/2002 | Hazama | ...................... | 370/474 |
| 6,751,206 B1 * | 6/2004 | Padovani et al. | ............ | 370/335 |
| 6,775,302 B1 * | 8/2004 | Shaffer et al. | ............... | 370/518 |
| 6,834,039 B1 * | 12/2004 | Kelly et al. | ................. | 370/229 |
| 6,973,084 B1 * | 12/2005 | Jha | ............................. | 370/392 |
| 7,068,651 B2 * | 6/2006 | Schmidt et al. | ............. | 370/389 |
| 7,305,047 B1 * | 12/2007 | Turner | ......................... | 375/316 |
| 7,360,142 B1 * | 4/2008 | Barash | ........................ | 714/758 |
| 7,512,854 B2 * | 3/2009 | Aldereguia et al. | ......... | 714/731 |
| 2002/0191615 A1 * | 12/2002 | Paul et al. | ................. | 370/395.1 |
| 2003/0147422 A1 * | 8/2003 | You et al. | ................... | 370/468 |
| 2003/0179712 A1 * | 9/2003 | Kobayashi et al. | .......... | 370/249 |
| 2003/0188032 A1 * | 10/2003 | Solomon et al. | ............ | 709/250 |
| 2004/0017778 A1 * | 1/2004 | Bansal et al. | ............... | 370/242 |
| 2004/0037311 A1 * | 2/2004 | Willes et al. | ................ | 370/465 |
| 2006/0129691 A1 * | 6/2006 | Coffee et al. | ................ | 709/230 |
| 2007/0008884 A1 * | 1/2007 | Tang | .......................... | 370/230 |

OTHER PUBLICATIONS

"SerialLite Protocol Specification" Revision 1.0, Nov. 2003, (c) Altera Corp. and Innocor Ltd., pp. 1-78.

* cited by examiner

*Primary Examiner*—Thong H Vu
(74) *Attorney, Agent, or Firm*—Treyz Law Group; G. Victor Treyz; Nancy Y. Ru

(57) ABSTRACT

Integrated circuits such as programmable logic device integrated circuits are provided with transmitter and receiver circuitry for communicating over multi-lane serial communications links. Data is transmitted over the serial communications links in the form of data packets. Priority data packets may be nested within regular data packets. Regular data packets may be formed using start-of-packet and end-of-packet markers. The locations at which priority packets are nested within regular data packets may be denoted using suspend and continuation markers. A single cyclic redundancy check generator may be used to generate cyclic redundancy check words for the data packets. Start-of-packet markers, end-of-packet markers, suspend markers, continuation markers, and cyclic redundancy check words may be inserted and extracted from the serial communications link at fixed lane locations.

20 Claims, 25 Drawing Sheets

| FIRST LANE | SECOND LANE | THIRD LANE | FOURTH LANE | |
|---|---|---|---|---|
| IDL | IDL | SOP | SOP | ← C1 |
| D0 | D1 | D2 | D3 | ← C2 |
| D4 | D5 | D6 | D7 | ← C3 |
| D8 | D9 | D10 | D11 | ← C4 |
| D12 | D13 | D14 | D15 | ← C5 |
| D16 | PAD | PAD | PAD | ← C6 |
| EOP | EOP | CRC | CRC | ← C7 |

FIG. 12

| FIRST LANE | SECOND LANE | THIRD LANE | FOURTH LANE | |
|---|---|---|---|---|
| IDL | IDL | SOP | SOP | ← C1 |
| D0 | D1 | D2 | D3 | ← C2 |
| D4 | D5 | D6 | D7 | ← C3 |
| D8 | D9 | D10 | D11 | ← C4 |
| D12 | D13 | D14 | D15 | ← C5 |
| D16 | IDL | IDL | IDL | ← C6 |
| EOP | EOP | CRC | CRC | ← C7 |

| FIRST LANE |
|---|
| D16 |
| EOP |
| EOP |
| CRC |
| CRC |

FIG. 15

| FIRST LANE | SECOND LANE | |
|---|---|---|
| D16 | IDL | ← C1 |
| EOP | EOP | ← C2 |
| CRC | CRC | ← C3 |

FIG. 16

| FIRST LANE | SECOND LANE | THIRD LANE | |
|---|---|---|---|
| D16 | IDL | IDL | ← C1 |
| EOP | EOP | CRC | ← C2 |
| CRC | IDL | IDL | ← C3 |

FIG. 17

| FIRST LANE | SECOND LANE | THIRD LANE | FOURTH LANE | |
|---|---|---|---|---|
| D16 | IDL | IDL | IDL | ← C1 |
| EOP | EOP | CRC | CRC | ← C2 |

SERIAL COMMUNICATIONS SYSTEMS WITH CYCLIC REDUNDANCY CHECKING

BACKGROUND

This invention relates to serial communications, and more particularly, to serial communications systems that use a serial communications protocol having efficient cyclic redundancy checking capabilities.

Serial communications formats are often used in modern electronics systems. Serial communications can be faster than parallel communications, use fewer pins, and, particularly when differential signaling schemes are used, can have higher noise immunity.

It can be challenging to handle serial data streams at high data rates (e.g., at data rates above several Gbps). As a result, it is often advantageous to support high-speed serial data communications using multiple smaller serial data paths (lanes) operating in parallel. Using this approach, large amounts of data can be transmitted from a transmitter to a receiver using relatively modest resources.

Robust serial links often use error checking schemes such as the cyclic redundancy checking (CRC) error checking scheme. A CRC code is computed for each block of data before transmission over the serial link. The CRC code is transmitted to the receiver from the transmitter. At the receiver, a new CRC code is computed based on the received data to determine whether the transmitted data has been corrupted. The receiver compares the value of the newly-computed CRC code to the value of the CRC code that was originally computed at the transmitter. If the original CRC code and the newly-computed CRC code match, the receiver can process the received data normally. If the original CRC code and the newly-computed CRC code do not match, the receiver can conclude that an error has arisen during the data transmission process.

In serial links with multiple lanes, it can be difficult to efficiently implement CRC functions. As a result, more resources are consumed on integrated circuits that support multilane serial communications with CRC capabilities than is desired. It would therefore be desirable to be able to provide ways to implement CRC operations more efficiently for serial links with multiple lanes.

SUMMARY

In accordance with the present invention, integrated circuits such as programmable logic device integrated circuits are provided that support data communications over serial communications links that contain single or multiple lanes. Data may be transmitted in packets formed from data words. Regular data packets may be formed by inserting start-of-packet and end-of-packet markers at fixed lane locations with the serial link. Priority data packets may be nested within regular data packets. Packets may be segmented by inserting suspend markers and continuation markers that are distinct from the start-of-packet and end-of-packet markers into the serial link at fixed lane locations.

Cyclic redundancy check words may be computed using a single cyclic redundancy check generator to produce a single cyclic redundancy check result. Computations may be made on complete columns of data words. The cyclic redundancy check words may be inserted in the serial link at fixed lane locations. Use of the suspend and continuation markers to denote the locations of nested priority packets allows regular cyclic redundancy check computations to be completed before processing priority packet data.

When data is received from the serial link, start-of-packet markers, end-of-packet markers, suspend markers, continuation markers, and cyclic redundancy check markers may be extracted from the link using their known fixed lane locations.

Further features of the invention, its nature and various advantages will be more apparent from the accompanying drawings and the following detailed description of the preferred embodiments.

BRIEF DESCRIPTION OF THE DRAWINGS

FIG. 12 is a diagram of the data of FIG. 10 as it is being passed between a data encapsulation circuit and data path multiplexer in accordance with the present invention.

FIG. 13 is a diagram of the data of FIG. 13 as it is being passed between a data path multiplexer and lane striping circuitry in accordance with the present invention.

FIG. 14 is a diagram showing how data words, end-of-packet markers, and CRC words are distributed in a single-lane serial communications link in accordance with the present invention.

FIG. 15 is a diagram showing how data words, end-of-packet markers, and CRC words are distributed in a two-lane serial communications link in accordance with the present invention.

FIG. 16 is a diagram showing how data words, end-of-packet markers, and CRC words are distributed in a three-lane serial communications link in accordance with the present invention.

FIG. 17 is a diagram showing how data words, end-of-packet markers, and CRC words are distributed in a four-lane serial communications link in accordance with the present invention.

DETAILED DESCRIPTION

The present invention relates to serial communications. More particularly, the present invention relates to efficient cyclic redundancy check (CRC) functions for use in integrated circuits such as programmable logic device integrated circuits. Aspects of the invention relate to computer-aided design tools that help logic designers design integrated circuits that include the efficient CRC functions and to methods of using such circuits in serial communications links.

Serial communications may involve a single path (i.e., a single differential pair of signal wires over which data is conveyed in series) or may involve multiple parallel serial paths (called multi-lane). In a multi-lane arrangement, a relatively higher-rate serial link is formed from multiple parallel relatively lower-rate serial paths. For example, four lanes operating at about 3.125 Gbps may be used in parallel to support the functions of a 12.5-Gbps serial link. This is merely one illustrative configuration. The data streams from any number of lower-rate serial lanes may be combined to form a higher-rate serial link.

Figure 1:
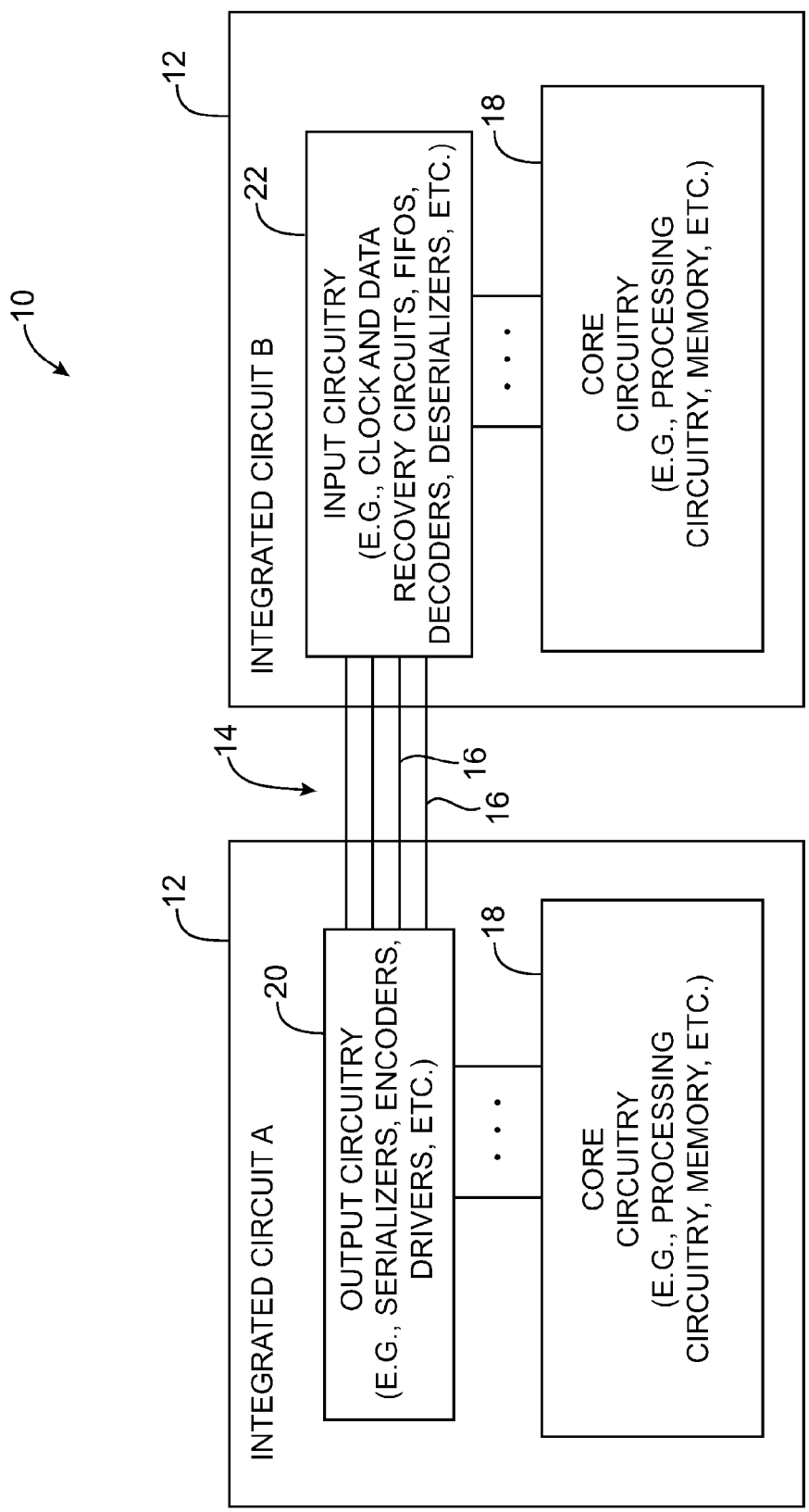
FIG. 1 is a diagram showing how two integrated circuits can communicate over a serial communications link made up of four parallel lanes using a serial communications protocol in accordance with the present invention.

An illustrative system 10 that supports multi-lane serial communications is shown in FIG. 1. The equipment of system 10 has two integrated circuits 12 that communicate over a serial communications link 14 that is compliant with a multi-lane serial communications protocol. The integrated circuits 12 may be used in any suitable electronics equipment. For example, each integrated circuit 12 may be mounted on a different line card connected to a common system backplane in rack-mounted data processing or telecommunications equipment. As another example, integrated circuits 12 may be mounted on the same card or may be used in other types of electronic equipment. Each integrated circuit 12 may be, for example, a programmable logic device, a microprocessor, a digital signal processor, an application-specific integrated circuit (ASIC), etc.

Serial link 14 is generally a high-speed link having a data rate of many Gbps, although slower serial links may be used if desired. Link 14 may be made up of a number of slower parallel serial links (lanes) 16. Each lane 16 may, for example, be formed from a differential signal path having a pair of conductors that support communications at a serial data rate of a few Gbps.

The use of multi-lane serial links such as the illustrative four-lane link 14 of FIG. 1 to support communications between chips in an electrical system such as system 10 helps to overcome some of the difficulties associated with handling single-link serial data streams at extremely high data rates (e.g., 10 Gbps), because each of the lanes 16 has a lower data rate than would be required if all of their serial data were passed through a single pair of differential signal conductors.

When multiple lanes are used in a link 14, the data from within a sending integrated circuit (e.g., a local circuit A) is distributed among the lanes 16 in a particular order and is reconstructed at a receiving integrated circuit (e.g., a remote circuit B).

In general, integrated circuits such as circuits 12 of FIG. 1 may have only transmitting circuitry or may have only receiving circuitry (called unicast or unidirectional mode), or may have both transmitting and receiving circuitry with an equal number of transmit and receive lanes (symmetrical) or an unequal number (asymmetrical). In the example of FIG. 1, integrated circuit A has core circuitry 18 that generates data. Output circuitry 20 may be used to serialize the data from core circuitry 18 and to encode the data to embed a clock in each data stream. Drivers in output circuitry 20 may be used to transmit the data from circuitry 18 to integrated circuit B over the multiple parallel lanes 16 of serial link 14.

At the receiving end of link 14, input circuitry 22 can be used to receive the transmitted data. The input circuitry 22 may include clock and data recovery circuits for extracting embedded clock signals and first-in-first-out (FIFO) buffer circuitry for deskewing and synchronizing the incoming data on the parallel lanes 16. Input circuitry 22 may also include decoding circuitry for decoding data that was encoded in output circuitry 20 and deserializers for converting the serial data from lanes 16 to parallel data. The resulting data is provided to core circuitry 18 on integrated circuit B. Core circuitry 18 may be any type of circuitry, including programmable logic, microprocessor circuitry, digital signal processor circuitry, processing circuitry that is part of an application-specific integrated circuit, memory circuitry, etc.

A serial communications protocol in accordance with the present invention preferably supports data path features such as streaming data and packetized data transmission arrangements, priority data packet encapsulation and nesting, and data integrity protection. A user can also establish a desired number of user-defined data channels (data channel multiplexing).

Integrated circuits in systems that are compliant with the serial communications protocol of the present invention can transmit data in either streaming mode or packet mode. In streaming mode, data is transmitted over link 14 without encapsulating the data in packets. This mode may be appropriate, for example, for transmitting real-time video information. In packet mode, pieces of data are encapsulated in packets. The packets have associated markers which can be used to enable functions such as retry-on-error functions. The streaming and packet modes are preferably optional. A logic designer can select which of these modes to implement in a given design based on the type of data transmission tasks that need to be handled over the serial link 14.

In packet mode, different types of data may have different associated priority levels. For example, regular data may be transmitted in the form of regular data packets using a regular data port. A priority port may also be provided to allow more important data ("priority data") to be inserted within the regular data, without waiting for a break in transmission. With this type of scheme, priority packets are nested inside of regular data packets. Priority packets are encapsulated between priority packet markers, so that the priority data may be identified as priority data when received and placed on an appropriate priority port at the receiving integrated circuit.

Data integrity protection may be provided in systems using circuits that are compliant with the serial communications protocol. Data integrity protection is preferably an optional and adjustable feature. This allows a logic designer to select a desired level of protection to implement on a given circuit. A logic designer may, for example, opt to include two-byte (16-bit) cyclic redundancy checking (CRC-16) in a given integrated circuit. Alternatively, the logic designer may chose to implement CRC-32 capabilities or may opt not to include any data integrity protection. Data integrity protection can be implemented independently on the regular and priority data ports.

Retry-on-error functions are used to help ensure the successful delivery of data to a remote integrated circuit. Priority packets can be divided into segments, with the segment size determined by the user based on their system requirements. With this type of arrangement, each outgoing data segment from a local integrated circuit is labeled with a segment number (segment ID). The remote integrated circuit examines incoming segments to determine whether there has been a transmission problem (e.g., a bad segment or an out-of-order segment). Acknowledgement (ACK) and negative acknowledgement (NACK) signals may be transmitted from the remote integrated circuit to the local integrated circuit to inform the local integrated circuit whether or not segments have been successfully received. The local integrated circuit awaits confirmation from the remote integrated circuit that the transmitted data segment has been successfully received. If the data segment has been successfully received, the local integrated circuit can transmit additional data segments. If the data segment has not been successfully received, the local integrated circuit can resend the data segment.

The local integrated circuit inserts idle characters to fill gaps in the data being transmitted over link 14 to the remote integrated circuit. This ensures that the link operates properly, even when no actual data is being transmitted in the gaps.

The present invention may be used in the context of any system using any suitable integrated circuits that use serial communications (i.e., microprocessors, digital signal processors, application specific integrated circuits, etc.). With one particularly suitable arrangement, the communications functions of the present invention are used in the context of systems based on programmable logic device integrated circuits.

Figure 2:
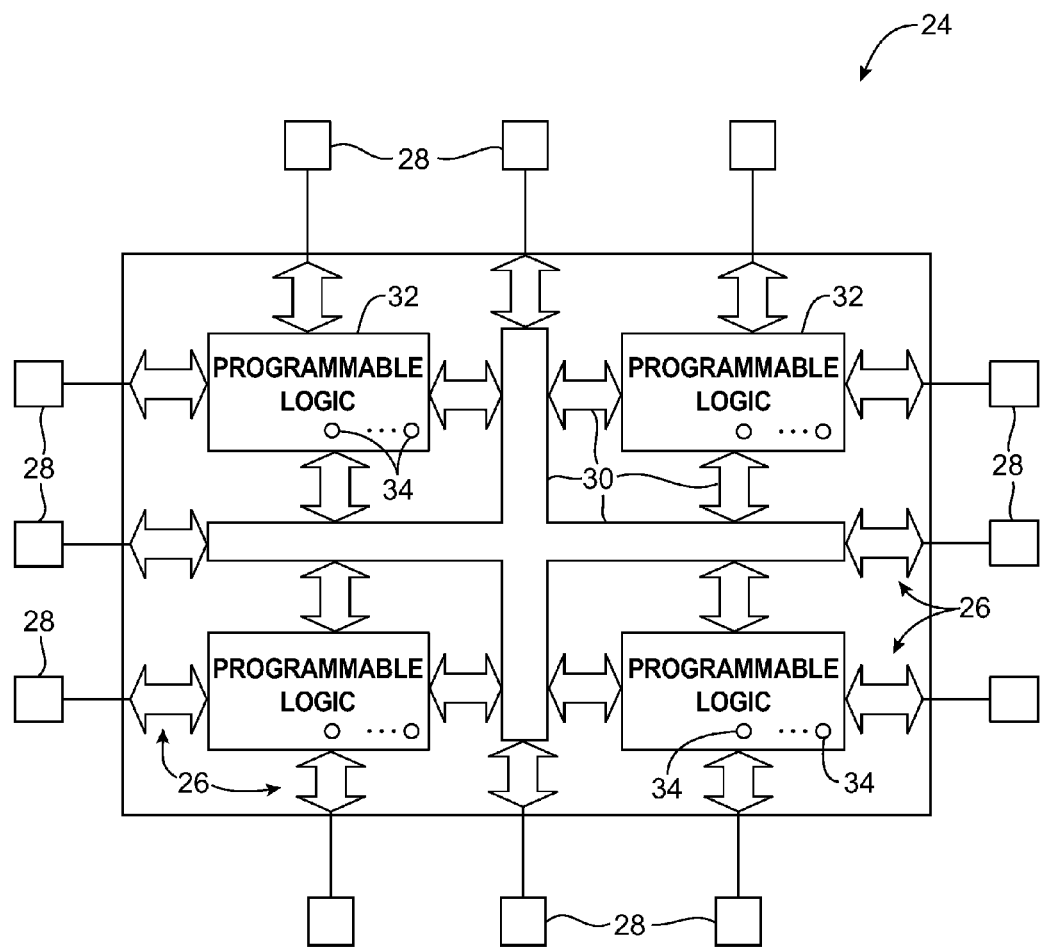
FIG. 2 is a diagram of an illustrative programmable logic device integrated circuit that may communicate using a serial communications protocol in accordance with the present invention.

An illustrative programmable logic device 24 in accordance with the present invention is shown in FIG. 2.

Programmable logic device 24 may have input/output circuitry 26 for driving signals off of device 24 and for receiving signals from other devices via input/output pins 28. Input/output circuitry 26 may include serial communications circuitry such as the output circuitry 20 and input circuitry 22 of FIG. 1. Certain pairs of pins 28 may be associated with respective pairs of differential signal conductors. Each pair of differential signals conductors may be associated with a respective lane 16 (FIG. 1) for supporting high-speed serial communications.

Interconnection resources 30 such as global and local vertical and horizontal conductive lines and busses may be used to route signals on device 24. Programmable logic 32 may include combinational and sequential logic circuitry including logic gates, multiplexers, switches, memory blocks, look-up-tables, logic arrays, etc. These illustrative components are not mutually exclusive. For example, look-up tables and other components that include logic gates and switching circuitry can be formed using multiplexers. Some of the logic of programmable logic device 24 is fixed. Programmable logic 32 includes components that may be configured so that device 24 performs a desired custom logic function.

Programmable logic device 24 may be based on any suitable programmable technology. With one suitable approach, configuration data (also called programming data) may be loaded into programmable elements 34 using pins 28 and input/output circuitry 26. The programmable elements (also sometimes called configuration bits or programmable function control elements) may each provide a static control output signal that controls the state of an associated logic component in programmable logic 32.

In a typical arrangement, the programmable elements 34 may be random-access memory (RAM) cells that are loaded from an external erasable-programmable read-only memory chip via certain pins 28 and appropriate portions of input/output circuitry 26. The loaded RAM cells 34 provide static control signals that are applied to the terminals (e.g., the gates) of circuit elements (e.g., metal-oxide-semiconductor transistors) in programmable logic 32 to control those elements (e.g., to turn certain transistors on or off) and thereby configure the logic in programmable logic 32. Circuit elements in input/output circuitry 26 and interconnection resources 30 are also generally configured by the RAM cell outputs as part of the programming process. The circuit elements that are configured in input/output circuitry 26, interconnection resources 30, and programmable logic 32 may be transistors such as pass transistors or parts of multiplexers, look-up tables; logic arrays, AND, OR, NAND, and NOR logic gates, etc.

RAM-based programmable logic device technology is merely one illustrative example of the type of technology that may be used to implement programmable logic device 24. Other suitable programmable logic device technologies that may be used for device 24 include one-time programmable device arrangements such as those based on programmable logic elements made from fuses or antifuses, programmable logic devices in which elements 34 are formed from electrically-programmable read-only-memory (EPROM) or erasable-electrically-programmable read-only-memory (EEPROM) technology, programmable logic devices with programmable elements made from magnetic storage elements, programmable logic devices with mask-programmed elements, etc.

The circuitry of device 24 may be organized using any suitable architecture. As an example, the logic of programmable logic device 24 may be organized in a series of rows and columns of larger programmable logic regions or areas each of which contains multiple smaller logic regions or areas (e.g., areas of logic based on look-up tables or macrocells). These logic resources may be interconnected by interconnection resources such as associated vertical and horizontal interconnection conductors. Interconnection conductors may include global conductive lines that span substantially all of device 24, fractional lines such as half-lines or quarter lines that span part of device 24, staggered lines of a particular length (e.g., sufficient to interconnect several logic areas), smaller local lines that interconnect small logic regions in a given portion of device 24, or any other suitable interconnection resource arrangement. If desired, the logic of device 24 may be arranged in more levels or layers in which multiple large areas are interconnected to form still larger portions of logic. Still other device arrangements may use logic that is not arranged in rows and columns. Portions of device 24 (e.g., in input/output circuitry 26 and elsewhere) may be hardwired. As an example, hardwired transmitter and receiver circuitry may be used to assist in serial communications functions. Hardwired digital signal processing circuitry (e.g., multipliers, adders, etc.) may also be used.

Figure 3:
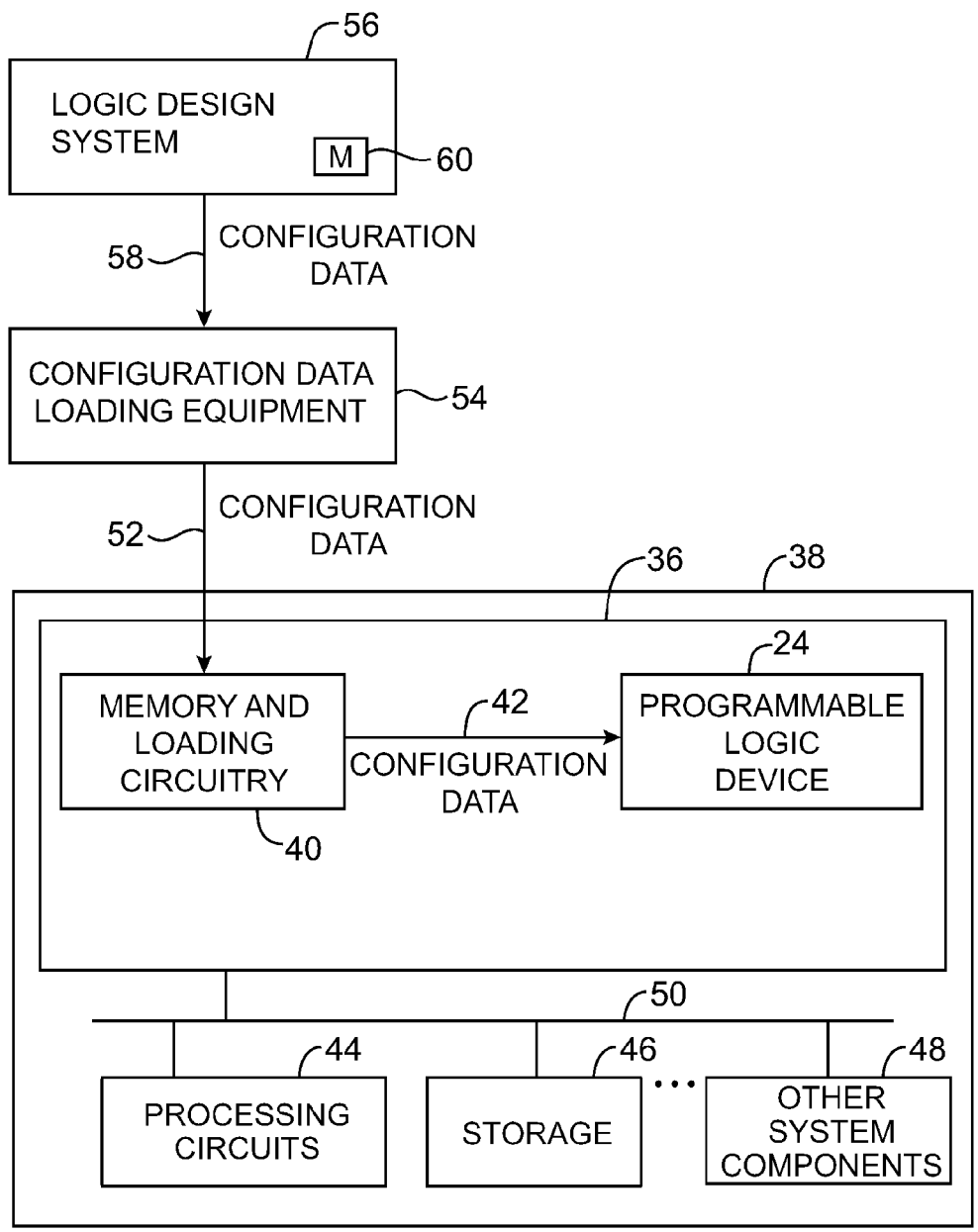
FIG. 3 is a diagram showing how configuration data may be generated for a programmable logic device integrated circuit in accordance with the present invention.

An illustrative system environment for a programmable logic device 24 is shown in FIG. 3. Programmable logic device 24 may be mounted on a board 36 in a system 38. In general, programmable logic device 24 may receive programming data from programming equipment or from any other suitable equipment or device. In the example of FIG. 3, programmable logic device 24 is the type of programmable logic device that receives configuration data from an associated memory chip 40. With this type of arrangement, memory and loading circuitry 40 may, if desired, be mounted on the same board 36 as programmable logic device 24. The circuitry 40 may be an erasable-programmable read-only memory (EPROM) chip, a PLD configuration data loading chip with built-in memory, or other non-volatile memory device. When system 38 boots up (or at another suitable time), the configuration data for configuring the programmable logic device may be supplied to programmable logic device 24 from device 40, as shown schematically by path 42. The configuration data that is supplied to the programmable logic device may be stored in the programmable logic device in configuration data cells (memory).

System 38 may include processing circuits 44, storage 46, and other system components 48 which may, if desired, contain circuitry that communicates with device 24 over a multi-lane serial communications link. The components of system 38 may be located on one or more boards such as board 36 or other suitable mounting structures or housings and may be interconnected by busses and other electrical paths 50, which may include single-lane and multi-lane serial communications links.

Memory 40 may be supplied with the configuration data for device 24 over a path such as path 52. Memory 40 may, for example, receive the configuration data from configuration data loading equipment 54 or other suitable equipment that stores this data in memory 40.

It can be a significant undertaking to design and implement a desired logic circuit in a programmable logic device and to perform other system design activities. Logic designers therefore generally want to use logic design systems based on computer-aided-design (CAD) tools to assist them in designing circuits and systems. A logic design system can help a logic designer design and test complex circuits for a system. When a design is complete, the logic design system may be used to generate configuration data for programming the appropriate programmable logic device or mask sets for creating a custom chip.

As shown in FIG. 3, the configuration data produced by a logic design system 56 may be provided to configuration data loading equipment 54 over a path such as path 58. The equipment 54 can program the configuration data into device 40, so that device 40 can later provide this configuration data to the programmable logic device 24 over path 42.

In arrangements of the type shown in FIG. 3, the programmable logic device 24 may have configuration data cells formed from memory cells such as static random-access memory cells. This is merely one illustrative arrangement for programming a programmable logic device 24. Any suitable arrangement for programming programmable logic device 24 may be used if desired. For example, programmable logic device 24 may be based on non-volatile configuration data cells such as erasable-programmable read-only memory (EPROM) cells. With this type of arrangement, device 24 can be configured by programming the configuration data into the EPROM cells on the device. Programmable logic device 24 may also be based on programmable elements such as fuses and antifuses or programmable elements based on other technologies (e.g., magnetic devices, etc.).

Regardless of the particular approach used for programming programmable logic device 24, programmable logic device 24 can be configured using configuration data produced by a logic design system 56.

Logic design system 56 includes storage 60. Software is used to implement the functions of system 56. The software may be stored on a computer-readable medium (storage) 60. Storage 60 may include computer memory chips, removable and fixed media such as hard disk drives, flash memory, compact discs (CDs), DVDs, and floppy diskettes, tapes, or any other suitable memory or storage device(s). When the software of system 56 is installed, storage 60 has instructions and data that cause the computing equipment in logic design system 56 to execute various methods (processes). When performing these processes, the computing equipment is configured to implement the functions of the logic design system 56.

Figure 4:
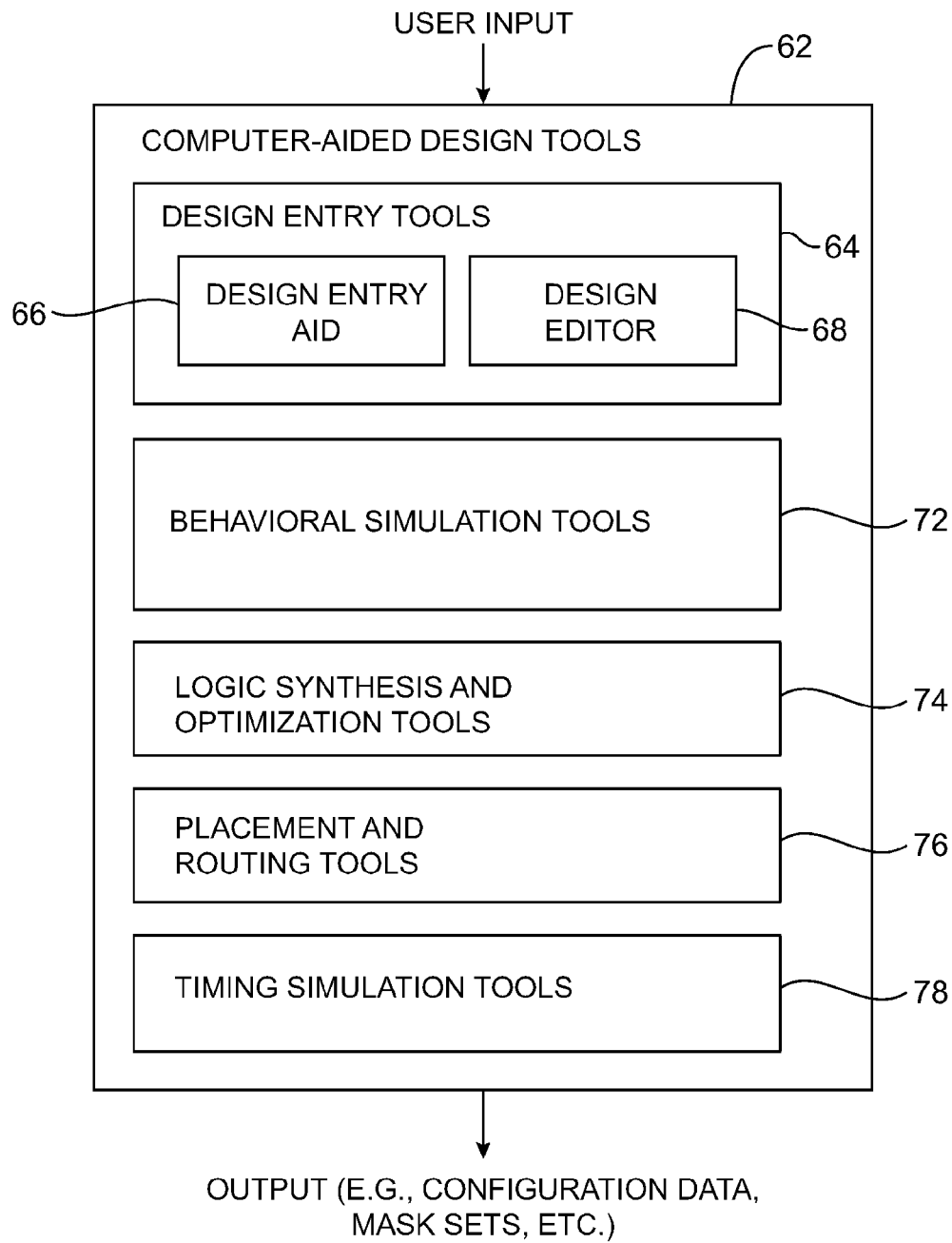
FIG. 4 is a diagram showing how computer-aided design tools may be used to create a logic design based on user input in accordance with the present invention.

Logic design system 56 may use computer-aided design tools such as tools 62 of FIG. 4. Tools such as tools 62 may be used to produce the configuration data for the programmable logic device 24 from a set of design specifications or other suitable input. Tools such as tools 62 can also be used to generate output in other suitable formats (e.g., as specifications for lithographic mask sets for semiconductor fabrication of a desired integrated circuit, etc.).

The design process typically starts with the formulation of logic circuit functional specifications. A logic designer can specify how a desired circuit should function using design entry tools 64. Design entry tools 64 may include tools such as design entry aid 66 and design editor 68. Design entry aids 66 help a logic designer locate a desired design from a library of existing logic designs and may provide computer-aided assistance to the logic designer for entering (specifying) the desired design. As an example, design entry aid 66 may be used to present screens of options for a user. In accordance with the present invention, these on-screen options may allow a user to choose whether to implement cyclic redundancy check (CRC) functions on the programmable logic device integrated circuit 24. The user may, for example, click on the on-screen options to select from a list of available data integrity protection options. The options determine which data integrity protection features the regular data port and/or priority data port of a circuit should have (e.g., no protection, CRC-16 protection, or CRC-32 protection). Design editor 68 may be used to enter a design (e.g., by entering lines of hardware description language code), may be used to edit a design obtained from a library (e.g., using a design entry aid), or may assist a user in selecting and editing appropriate prepackaged code/designs.

Design entry tools 64 may be used to allow a logic designer to provide a desired logic design to logic system 62 using any suitable format. For example, design entry tools 64 may include tools that allow the logic designer to enter a logic design using truth tables. Truth tables can be specified using text files or timing diagrams and may be imported from a library. Truth table logic design entry may be used for a portion of a large circuit or for an entire circuit.

As another example, design entry tools 64 may include a schematic capture tool. A schematic capture tool may allow the logic designer to visually construct logic circuits from constituent parts such as logic gates and groups of logic gates. Libraries of preexisting logic circuits may be used to allow a desired portion of a design to be imported with the schematic capture tools.

If desired, design entry tools 64 may allow the logic designer to provide a logic design to the logic design system 56 using a hardware description language such as Verilog hardware description language (HDL) or Very High Speed Integrated Circuit Hardware Description Language (VHDL). The logic designer can enter the logic design by writing hardware description language code with editor 68. Blocks of code may be imported from libraries if desired.

After the design has been entered using design entry tools 64, behavioral simulation tools 72 may be used to simulate the functional performance of the design. If the functional performance of the design is incomplete or incorrect, the logic designer can make changes to the design using design entry tools 64. The functional operation of the new design can be verified using behavioral simulation tools 72 before synthesis operations have been performed using tools 74. Simulation tools such as tools 72 may also be used at other stages in the design flow if desired (e.g., after logic synthesis). The output of the behavioral simulation tools 72 may be provided to the logic designer in any suitable format (e.g., truth tables, timing diagrams, etc.)

Once the functional operation of the logic design has been determined to be satisfactory, logic synthesis and optimization tools 74 may be used to implement the logic design in a particular programmable logic device (i.e., in the logic and interconnect resources of a particular programmable logic device product or product family). As an example, if the logic design has serial communications circuitry that supports cyclic redundancy check features, the logic synthesis and optimization tools 74 may decide to use an available hardwired circuit block to perform operations in support of cyclic redundancy check computations. Tools 74 may also implement some or all of the cyclic redundancy check functions using a "soft" design—i.e., using mostly or entirely programmable logic resources. Because the cyclic redundancy check functions of the present invention may be implemented efficiently, fewer resources ("hard" and/or "soft") are needed than with conventional arrangements.

Tools 74 can optimize the design by proper selection of the available hardware to implement different logic functions in the logic design. Often tradeoffs are made because multiple logic functions are competing for limited resources.

After logic synthesis and optimization using tools 74, the logic design system may use tools such as placement and routing tools 76 to perform physical design steps (layout synthesis operations). Placement and routing tools 76 are used to determine how to place the circuits for each logic function within the programmable logic device. For example, if two counters interact with each other, the placement and routing tools 76 may locate these counters in adjacent logic regions on the programmable logic device to minimize interconnect delays. The placement and routing tools 76 create orderly and efficient implementations of logic designs for a given programmable logic device.

After an implementation of the desired logic design in the programmable logic device has been generated using placement and routing tools 76, the implementation of the design may be tested using simulation tools such as timing simulation tools 78. Timing simulation tools may, for example, predict the delay times that are associated with certain signal paths through the device. The timing simulation tools may be used to verify that the particular implementation of the design that is being tested does not contain signal paths with delays that are outside of the limits imposed during the design phase. For example, the timing simulation tools may be used to ensure that the slowest data paths are fast enough that the minimum desired clock speed and minimum signal path delay constraints are satisfied. The timing simulation tools may also examine the design for potential race conditions or other conditions that affect device performance.

After satisfactory testing using tools 78, the CAD tools 62 can produce the configuration data for the programmable logic device or can generate other suitable output data (e.g., the specifications for a lithographic mask set for fabricating an integrated circuit incorporating the logic design). Depending on the type of programmable logic device being used (e.g., a device based on non-volatile memory, a device based on volatile memory, a device based on fuses or antifuses, etc.), configuration data may be programmed into the programmable logic device directly or may be provided to a memory device that later (e.g., upon power-up) loads the configuration data into the programmable logic device to program the device.

In a typical system 10, there are multiple integrated circuits that communicate using multi-lane serial communications links. The logic designer can use system 56 and tools 62 to design the serial communications circuitry for each of the integrated circuits.

Figure 5:
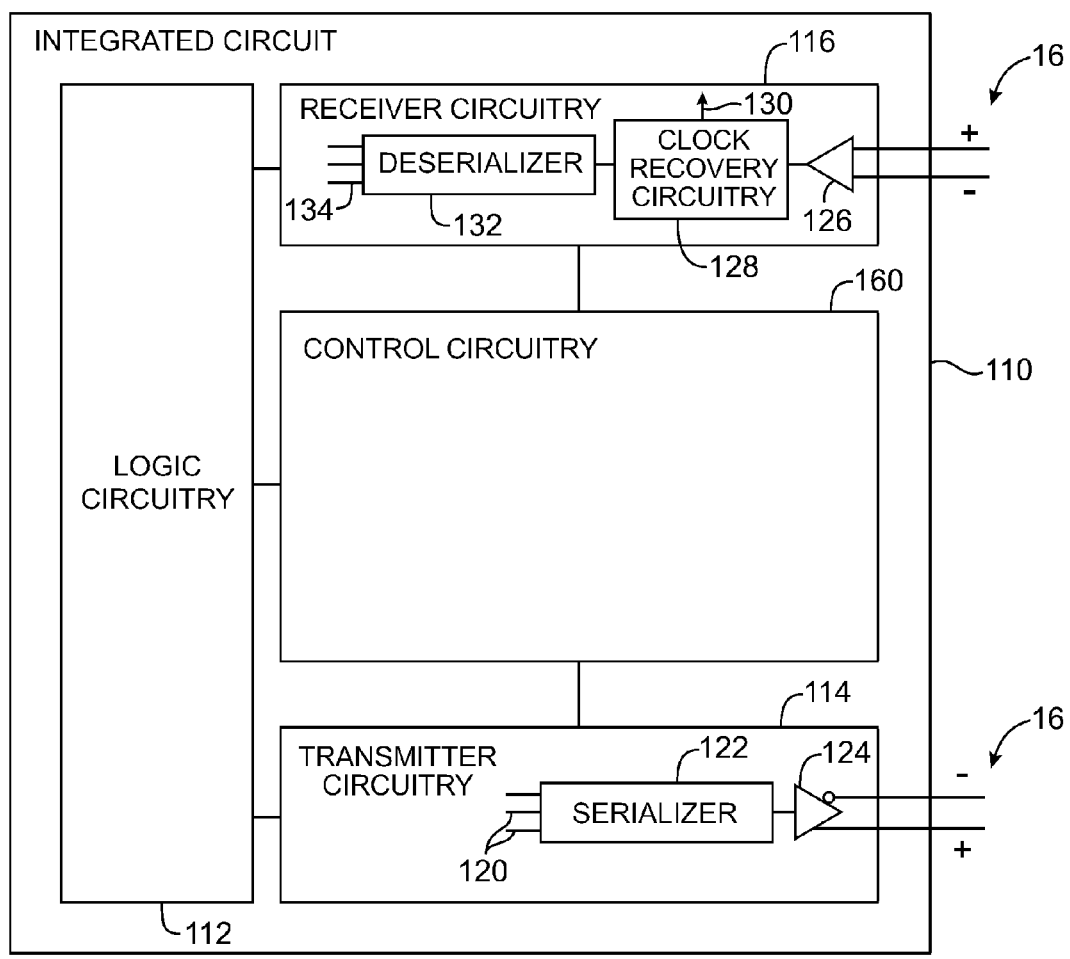
FIG. 5 is a diagram of an illustrative integrated circuit with serial communications circuitry constructed in accordance with the present invention.

A diagram of an illustrative integrated circuit 110 that includes circuitry suitable for performing the CRC functions of the present invention is shown in FIG. 5. Integrated circuit 110 may be a programmable logic device, microprocessor, digital signal processor, application specific integrated circuit, or other suitable integrated circuit. If circuit 110 is a programmable logic device, logic circuitry 112 on integrated circuit 110 will typically include programmable logic such as programmable logic 32 of FIG. 2 and hardwired logic. For other types of integrated circuit, logic circuitry 112 is generally hardwired digital logic circuitry.

Integrated circuit 110 may transmit digital data signals from logic circuitry 112 to other integrated circuits using transmitter circuitry 114. Receiver circuitry 116 may be used to receive digital data signals for logic circuitry 112 from other integrated circuits.

Transmitter circuitry 114 and receiver circuitry 116 are controlled by control circuitry 160. Circuitry 160 may include circuits for implementing data path and control plane functions for circuit 110. The circuitry of control circuitry 160 and circuitry 114 and 116 need not be mutually exclusive. For example, priority data port operations may be performed using circuitry 160 and circuitry in transmitter circuitry 114 and receiver circuitry 116.

Transmitter circuitry 114 receives signals from logic circuitry 112. Parallel inputs 120 may be used to provide data from logic circuitry 112 to serializer 122. Serializer 122 may serialize parallel data on inputs 120 so that the data can be transmitted over a serial link having one or more lanes. A differential driver 124 may drive serial data from the output of serializer 122 onto two parallel differential signal lines in lane 16. In the example of FIG. 5, there is only a single lane 16 associated with transmitter circuitry 114. This is merely illustrative. In general there may be one or more parallel lanes in a given serial link 14, as shown in FIG. 1.

Receiver circuitry 116 of FIG. 5 has a differential input driver 126 that receives data from another integrated circuit over a lane 16. Only a single lane 16 is associated with the receiver circuitry 116 in the example of FIG. 5. This is merely illustrative. Multiple parallel lanes in a serial link may be associated with receiver circuitry 116 if desired.

The differential data at the two inputs of differential input driver 126 of receiver circuitry 116 is provided to clock-and-data recovery (CDR) circuitry 128. Clock-and-data recovery circuitry 128 extracts embedded clock information from the incoming signal and provides the extracted clock signals at line 130. Recovered serial data is provided to deserializer 132. Deserializer 132 deserializes the data provided by clock recovery circuitry 128 and provides corresponding parallel data at output lines 134. The parallel data from output lines 134 may be distributed to logic circuitry 112.

The receiver circuitry 116, control circuitry 160, and the transmitter circuitry 114 are used to support multi-lane serial communications. In a given integrated circuit, the amount and type of circuit resources present in circuitry 114, 116, and 160 depends on which serial communications features were included by the designer. For example, a logic designer may click on a CRC-16 data integrity protection feature presented by tools 64 during the design process. When the integrated circuit is implemented as a chip, the chip will have control circuitry 160 that includes circuitry for performing CRC-16 operations. If, however, the logic designer clicked on an option presented by tools 64 that indicates that there should be no data integrity protection, the chip will have control circuitry 160 that does not include circuitry for CRC operations.

Figure 6:
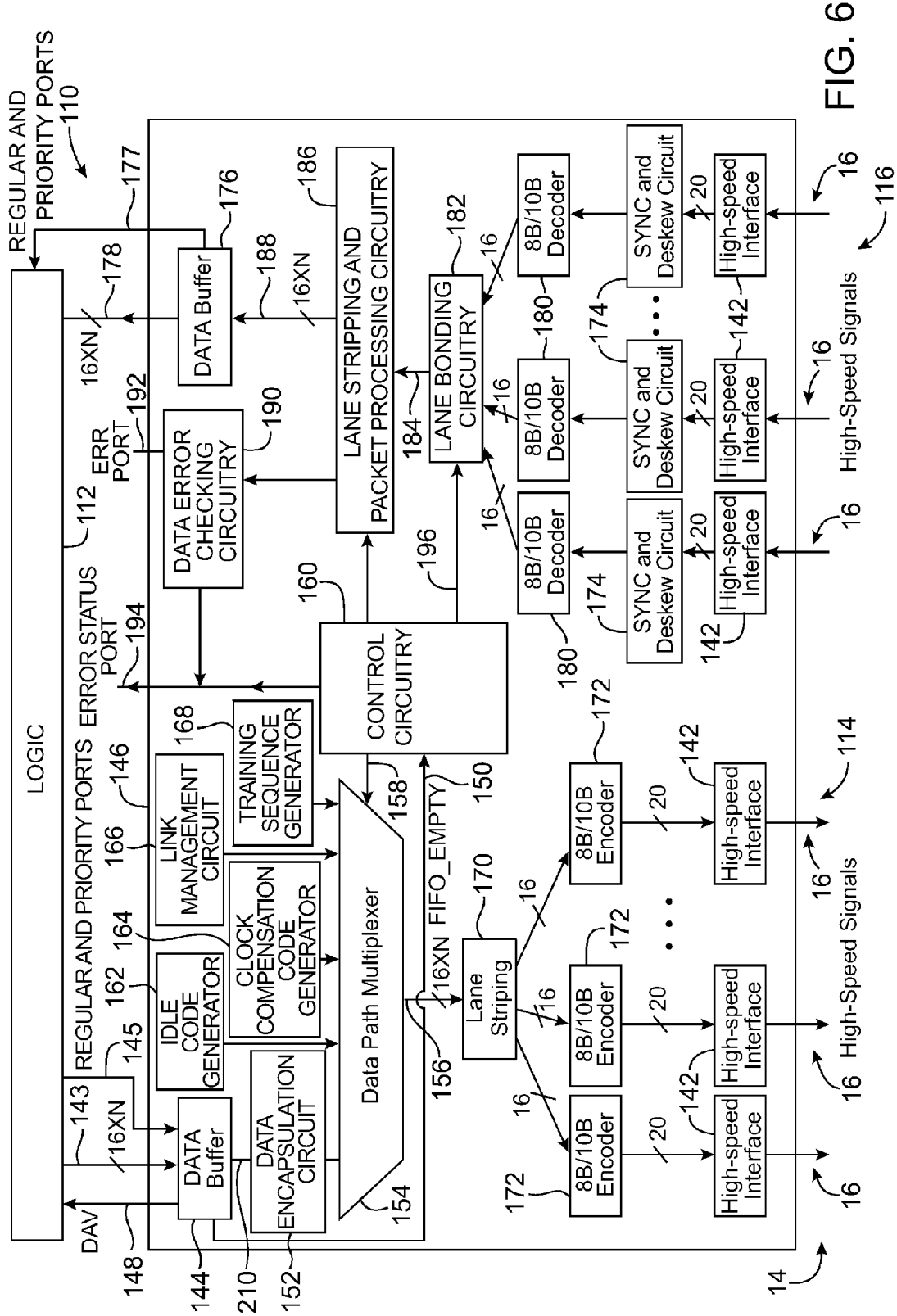
FIG. 6 is a more detailed diagram of an illustrative integrated circuit with serial communications circuitry constructed in accordance with the present invention.

An illustrative integrated circuit 110 which may be used to transmit and receive serial data in accordance with the serial communications protocol of the present invention is shown in FIG. 6. Integrated circuit 110 of FIG. 6 has input/output circuitry 146. Input/output circuitry 146 may, for example, be input/output circuitry such as circuitry 26 of FIG. 2 for integrated circuits 110 that are programmable logic devices.

Input/output circuitry 146 of integrated circuit 110 includes serial communications circuitry. For example, input/output circuitry 146 has transmitter circuitry 114 for transmitting data over one or more lanes 16 of serial link 14. Integrated circuit 110 also has receiver circuitry 116 for receiving serial communications from another integrated circuit over one or more lanes 16. High-speed interface circuitry 142 in the transmitter circuitry 114 includes serializer and driver circuitry such as serializer 122 and driver 124 of FIG. 5. High-speed interface circuitry 142 in the receiver circuitry 116 may include components such as the differential input driver 126, clock-and-data recovery circuitry 128, and deserializer circuitry 132 of FIG. 5.

Each lane 16 has two differential signal lines—a positive (+) line and a negative (−) line (shown in more detail in FIG. 5). To support two-way traffic, link 14 has both outgoing pairs of signal lines connected to transmitter circuitry 114 and incoming pairs of signal lines connected to receiver circuitry 116. The number of lanes 16 in link 14 is given by the integer N in FIG. 6. The value of N may be 1 (in a single-lane link) or may be more than 1. As an example, in a four-lane serial link 14 having four outgoing pairs of differential signal lines and having four incoming pairs of differential signals lines, the value of N is 4.

Data to be transmitted over link 14 from integrated circuit 110 to another integrated circuit is passed from logic 112 to data buffer 144 over paths such as path 143. In the example of FIG. 6, data words have 16 bits and the size of path 143 is N×16, where N is the number of lanes in link 14 (as an example). Paths 143 of different sizes may be used to convey data from logic 112 to data buffer 144 if desired.

Buffer 144 may be used to help provide an interface between logic 112 and input-output circuitry 146. When no more data can be accepted from logic 112 because the buffer is full (e.g., because first-in-first out (FIFO) circuitry in buffer 144 is full), the data available (DAV) signal on line 148 may be deasserted. Logic 112 may monitor the status of DAV to determine whether or not buffer 144 is ready to accept data. When the FIFO (or other suitable buffer circuitry) in buffer 144 is empty, the FIFO_EMPTY signal on line 150 may be asserted. When control circuitry 160 receives a FIFO_EMPTY signal from data buffer 144, the control circuitry 160 may insert idle codes into the outgoing data.

If desired, data from data buffer 144 may be encapsulated as packets using data encapsulation circuit 152. During the encapsulation process, a data payload may be encapsulated between start-of-packet (SOP) and end-of-packet (EOP) markers.

Regular and priority data can be implemented using data buffer 144. Data buffer 144 may have associated regular and priority data and address ports, shown schematically by line 145 in FIG. 6.

A data path multiplexer 154 or other suitable signal routing circuitry may be used to route the data to be transmitted to the final stages of the transmitter. Data path multiplexer 154 may have multiple inputs and a single output 156.

Control circuitry 160 may control the operation of input/output circuitry 146. For example, control circuitry 160 may control data path multiplexer 154 via control path 158. By controlling which control signals are applied to data path multiplexer 154 via control path 158, the control circuitry 160 can select which of the data path multiplexer's inputs is connected to the output 156. When, for example, it is desired to transmit data from data buffer 144 over link 14, the control circuitry 160 can direct the multiplexer 154 to connect the input connected to data encapsulation circuit 152 to output 156.

Data on the other multiplexer inputs may be routed to output 156 as appropriate. Data from idle code generator 162 may be routed through multiplexer 154 when it is desired to transmit idle codes. Clock tolerance compensation sequences (codes) from clock compensation code generator 164 may be inserted into the transmitted data to compensate for mismatches between the clock of integrated circuit 110 and the clock of the integrated circuit to which data is being transmitted over link 14. The clock compensation codes may be discarded at the receiver of the receiving integrated circuit to accommodate the clock mismatch.

Link management circuit 166 may be used to handle the generation of link management instructions (packets) for flow control operations, retry-on-error operations, etc. Multiplexer 154 may be used to send these link management instructions into the data stream when appropriate.

Training sequence generator 168 may be used to generate training sequences that are used during link initialization. Training sequence generator 168 may, for example, generate a first training sequence called TS1 and a second training sequence called TS2, which are used at various stages of the link initialization process. The training sequences TS1 and TS2 include handshaking information that is used to bring up link 14 during link initialization. Other types of training sequence information can be generated by generator 168 if desired.

Lane striping circuitry 170 may be used to distribute the 16×N bits of parallel data on output 156 among N respective busses associated with the N lanes 16. The use of 16-bits is an illustrative example, as other data path widths are also supported (e.g., 8-bit, 32-bit per lane). Two bytes of data may be distributed among the lanes at a time, which ensures that transmitted data is word aligned. Encoders 172 (e.g., 8B/10B encoders or other suitable encoders) may be used to convert 8-bit bytes of data into corresponding 10-bit coded words. The coded words supplied at the outputs of the encoders have the same information content as the data provided to their inputs. The additional bits in the coded words ensure that there are a sufficient number of high-to-low and low-to-high transitions in the data to allow successful clock extraction at the receiver. At the receiver, circuitry such as clock-and-data recovery circuitry 128 of FIG. 5 can be used to extract the embedded clock signal from the encoded data.

After passing through encoders 172, the outgoing data may be transmitted across link 14 on respective lanes 16 using the serializer and driver circuitry of high-speed interfaces 142. Typically the data being transmitted over link 14 is high-speed data (e.g., data transmitted at data rates of 100s of Mbps or Gbps).

Incoming data from the integrated circuit at the other end of link 14 may be received by the input drivers, clock-and-data recovery circuitry, and deserializers of the high-speed interface circuitry 142 in receiver circuitry 116. When there is more than one lane 16 of incoming data, synchronization and deskewing circuitry 174 may be used to synchronize and deskew the incoming data so that it can be successfully merged into a single stream of data suitable for transmission to logic 112 via data buffer 176 and path 178. Data buffer 176 may include first-in-first-out (FIFO) buffer circuitry. Buffer 176 may be used to implement a regular data port and a priority data port and may have associated data and address ports 177 for regular data and priority data, which may be monitored by logic 112.

Decoders 180 may be used to decode incoming data (e.g., from 10-bit codes to 8-bit data bytes). Lane bonding circuitry 182 may be used to merge multiple lanes of data into a single data path 184. Lane stripping and packet processing circuitry 186 may be used to remove data encapsulation information from the incoming data (e.g., to remove SOP and EOP characters). Stripped data may be provided at output 188.

Data error checking circuitry 190 may be used to check received data for errors (e.g., errors such as cyclic redundancy check (CRC) errors, 8B/10B errors or other decoding errors, etc.). If data error checking circuitry 190 detects an error, a suitable error signal may be generated. For example, an error signal may be asserted on ERR port 192 when an error is detected during retry-on-error operations. If a catastrophic error is detected, a catastrophic error signal may be produced by data error checking circuitry 190 and placed on error status port 194. Control circuitry 160 can also generate catastrophic error signals for port 194 when appropriate. Ports such as port 192 and 194 may be monitored by logic 112.

During data transmission operations, data gaps may be filed with idle codes that are optionally scrambled. If gaps were permitted to remain in the transmitted data, there would be potentially large periods of time during which no signals would be transmitted across link 14. This would disrupt the link, because the phase-locked-loop or delay-locked loop circuitry in the clock-and-date recovery circuit of the receiver would lose frequency lock on the data. As a result, control circuitry 160 preferably uses idle code generator 162 and data path multiplexer 154 (FIG. 6) to insert idle codes into gaps in the transmitted data. The idle codes serve as a type of "dummy data" that keeps the link 14 active even when no actual data needs to be transmitted.

Any suitable data characters may be used as idle codes preceeding the /IDL/ character. For example, the idle code generator 162 may produce the /IDL/ character, followed by psuedo random number generated (PRBS) scrambled data, generated from a Linear Feedback Shift Register (LFSR). This sequence of idle characters may be used to fill gaps (e.g., by merging these characters into the data path using data path multiplexer 154 of FIG. 6). Scrambling can be used to reduce electromagnetic interference (EMI) (i.e., radiated noise) on the lines in link 14 by eliminating repeating characters. When the idle characters are received at the remote end of the link 14, they may be discarded (ignored). The use of idle (IDL) characters helps ensure that data gaps do not affect the integrity of the link.

A logic designer can implement a desired level of data integrity protection for link 14. For example, a logic designer can choose to forego data integrity protection, can use CRC-16 protection, can use CRC-32 protection, etc.

Figure 7:
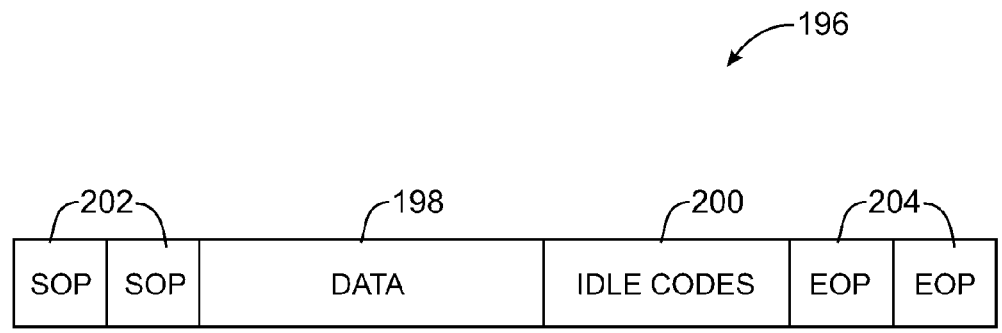
FIG. 7 is a diagram of a data packet with start and end markers and no cyclic redundancy check code in accordance with the present invention.

An illustrative data packet 196 that may be transmitted by circuit 110 when no data integrity protection has been implemented is shown in FIG. 7. Idle codes 200 are used to fill data gaps and ensure proper formatting of packet 196. The data payload 198 and idle codes (IDLs) 200 are encapsulated between start-of-packet (SOP) markers 202 and end-of-packet (EOP) markers 204. There is no redundancy information for performing error checking associated with packet 196. Because no data integrity protection capabilities are required in the scenario of FIG. 7, the circuitry for performing cyclic redundancy checking operations or other suitable data error checking functions may be omitted from the receiver circuitry 116, thereby reducing the amount of resources consumed by integrated circuit 110.

Figure 8:
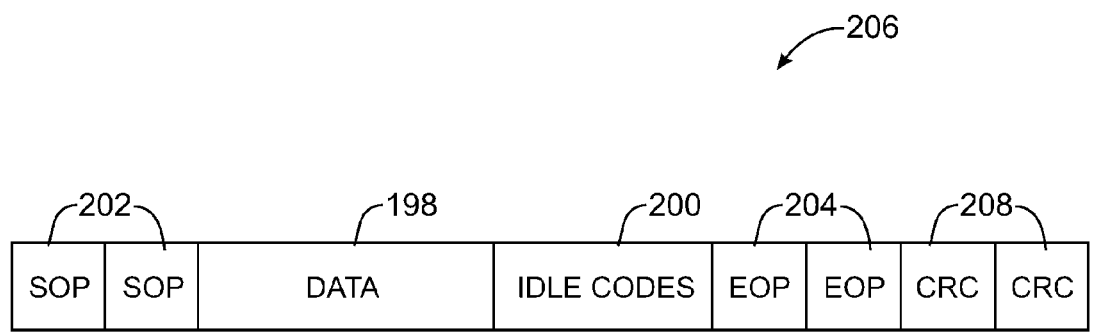
FIG. 8 is a diagram of a data packet with start and end markers and a cyclic redundancy check code in accordance with the present invention.

An illustrative data packet 206 when data integrity protection has been implemented is shown in FIG. 8. Cyclic redundancy check (CRC) words 208 are associated with packet 206. CRC words 208, which are sometimes referred to as redundancy information or CRC data, contain compressed information on the data payload 198. The CRC words 208 are produced by using data encapsulation circuit 152 of FIG. 6 to perform CRC operations on the data 198 before it is transmitted over link 14.

As shown in FIG. 8, the CRC words 208 are appended to the packet 206 following the EOP markers 204. After the data packet 206 has been transmitted over link 14, the CRC words 208 and contents of data payload 198 can be compared using data error checking circuitry 190 (FIG. 6) to determine whether the transmission of the data packet 206 over link 14 has introduced any errors. During this process, the data error checking circuitry 190 computes a new set of CRC words based on the version of data payload 198 that has been received. If the newly-computed CRC words do not match the CRC words that were included in the packet 206, appropriate error correction actions may be taken (e.g., the data can be retransmitted).

Figure 9:
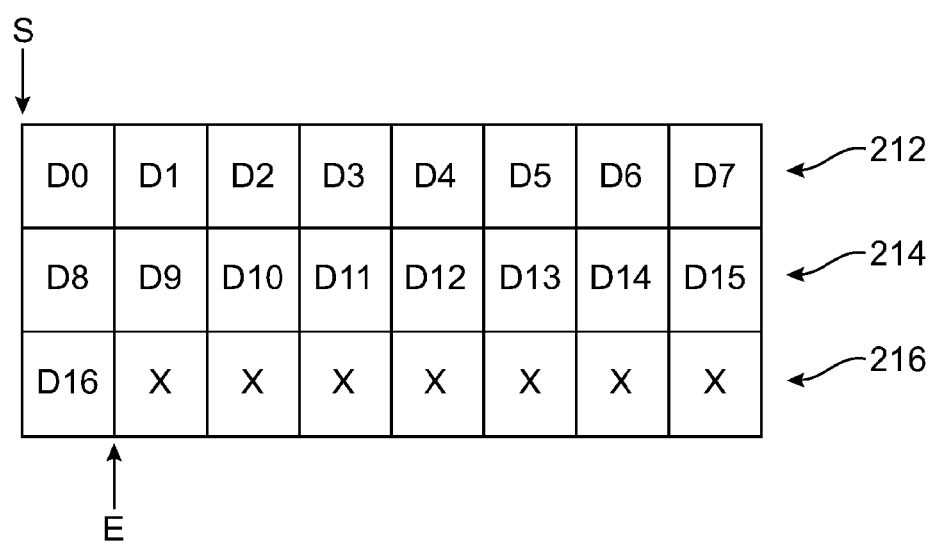
FIG. 9 is a diagram of data being passed between a data buffer and a data encapsulation circuit in serial communications circuitry.

During operation of logic 112, groups of data are generated that are to be transmitted over link 14 in the form of packets. Data is initially provided to data buffer 144. Data is then transferred from data buffer 144 to data encapsulation circuit 152 over path 210 (FIG. 6). The appearance of an illustrative set of data being transmitted over path 210 is shown in FIG. 9. In the example of FIG. 9, the data being transmitted includes 17 data words (D0, D1, D2, . . . D16). There are also 7 invalid (undefined) data words, which are labeled "X".

Path 210 (in this example) is a bus of sufficient width to allow the data to be grouped in three sets 212, 214, and 216, each of which includes eight words. Initially, set 212 is transferred in parallel over path 210 from data buffer 144 to data encapsulation circuit 152. On the next clock cycle, set 214 is transferred. Set 216 is transferred following set 214. During processing by data encapsulation circuit 152, the sets of data 212, 214, and 216 are converted into a data packet suitable for transmission to a receiver over a link 14. The link 14 may include multiple lanes 16. As an example, the link 14 may contain four parallel lanes 16. Prior to transmission and distribution by lane striping circuitry 170, idle codes are inserted into the data packet using idle code generator 162 and data path multiplexer 152.

Side-band data is provided to data encapsulation circuit 152 in parallel with the data sets 212, 214, and 216. The side-band data informs data encapsulation circuit 152 of the location of the start and end of the data being sent, and the destination address. Side-band data representing the start of the data is represented by the arrow S in FIG. 9. Side-band data representing the end of the data is represented by the arrow E in FIG. 9.

A conventional arrangement for placing the data of sets 212, 214, and 216 into a packet is described in connection with FIGS. 10, 11, and 12.

Figure 10:
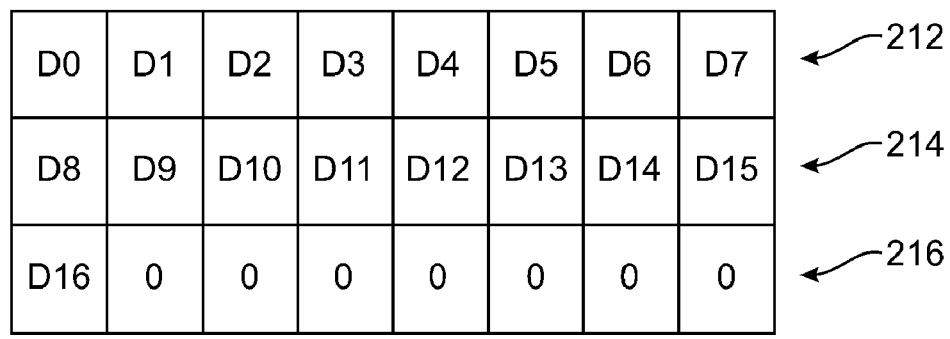
FIG. 10 is a diagram of the data of FIG. 9 after invalid data has been replaced by zeros according to a conventional communications protocol.

With a conventional approach, when the data of sets 212, 214, and 216 is received in the data encapsulation circuit 152, invalid data words are replaced by zeros, as shown in FIG. 10.

Before transmitting data across link, the data encapsulation circuit performs CRC calculations to generate CRC words corresponding to the data payload. As part of the CRC computation and data packet formatting process, the data words of the data packet are allocated to specific lanes in the serial communications link.

The data encapsulation circuit also adds pad words to facilitate CRC computations. The CRC words for the packet are computed on the data after the data has been allocated among the lanes and after the pad words have been added. SOP markers, the computed CRC words, and EOP markers are inserted in appropriate lane locations, with the SOP marker being the only marker in a fixed location. A CRC coverage block showing how data is allocated among lanes using a conventional lane allocation approach is presented in FIG. 11. The diagram of FIG. 11 corresponds to an example involving a four-lane serial link and a data packet containing 17 data words (i.e., the data words D0 to D16 of FIGS. 9 and 10). The FIG. 11 diagram shows how SOP markers, data words D0-D16, pad byte PAD, CRC words CRC1 and CRC2, and EOP markers have been allocated among each of the four lanes of the link.

Figure 11:
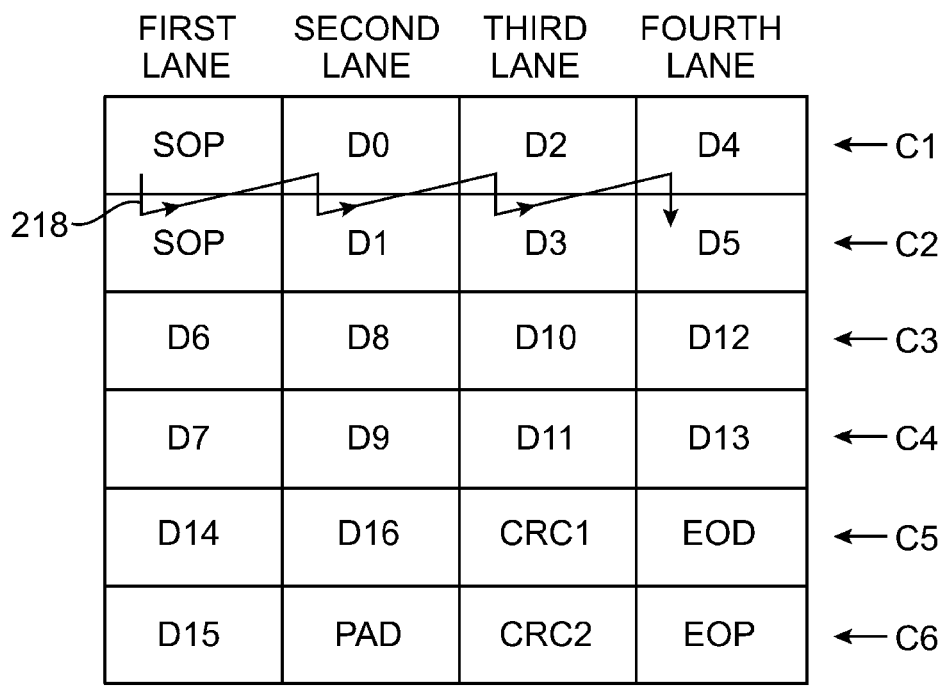
FIG. 11 is a diagram of the data of FIG. 10 as it is being passed between a conventional data encapsulation circuit and data path multiplexer.

As shown by line 218 of FIG. 11, the data encapsulation circuit uses a sawtooth pattern when distributing the SOP markers, data words, pad byte(s), CRC words, and EOP markers among the four lanes. With the sawtooth pattern, each lane receives two words at a time. The two SOP markers are used to fill the first two positions in the first lane. Data words D0 and D1 are allocated to the first two positions in the second lane. Data words D2 and D3 and data words D4 and D5 are then allocated to the third and fourth lanes, respectively. At this point, the first two "columns" C1 and C1 of the table are filled. Allocation continues using the same sawtooth pattern, filling columns C3, C4 completely with data. Column C5 receives data words D14 and D15. Data element D16 is allocated to column C6.

The conventional lane allocation technique of FIG. 11 results in columns such as C5 and C6, which are only partially filled with data words and pad bytes. Column C5 is partially filled, because only two of four lanes contain data (i.e., the first lane contains data word D14 and the second lane contains data word D15). Column C6 is partially filled, because only the first and second lanes are filled (i.e., the first lane contains data word D16 and the second lane contains a pad word).

The conventional lane allocation technique of FIG. 11 also results in CRC word locations and EOP marker locations that depend on the size of the data payload. In the example of FIG. 11, the CRC words CRC1 and CRC2 were allocated to the third lane. If, however, there had been a different number of data words in the packet, the lane location of the CRC words and the EOP markers would have been different.

The conventional technique of FIG. 11 therefore forces the data encapsulation circuit to handle CRC computations based on both full columns such as C3 and partial columns such as C5, which can create undesirable resource burdens. Additional resource burdens are created by the need to handle CRC words and EOP markers that are not in fixed lane locations.

A lane allocation scheme in accordance with the present invention is shown in the CRC coverage block of FIG. 12. With the scheme of FIG. 12, SOP markers, EOP markers, and CRC words are allocated to fixed lane locations. Not shown in FIG. 12, but also relevant, are the continue and suspend markers, which are used for packet nesting and channel multiplexing, for example, and which are analogous to SOP and EOP markers respectively. Pad words (bytes) are allocated to lanes as needed to ensure that each column in the CRC block contains only data words or only data words and pad words. After insertion of SOP markers, EOP markers, and CRC words, the pad words are replaced with idle (IDL) characters using idle code generator 162 and data path multiplexer 154, resulting in the data pattern shown in FIG. 13. This data is provided to encoders 172 and high speed interface circuitry 142 of FIG. 6 using lane striping circuitry 170.

As shown in FIG. 12, the lane allocation scheme of the present invention ensures that each column of the CRC coverage block that contains data words is completely full. Columns such as columns C1 and C7 of FIG. 12 contain no data words. Columns such as columns C2-05 contain only data. Column C6 contains data word D16 and pad words PAD, which are encoded as zeros for the CRC calculation. Because all columns that contain data words (i.e., columns C2-C6) contain only data payload words or pad data words, there are no partially-filled columns. This simplifies CRC computations and reduces the resource burdens imposed on the circuit to support CRC functions.

Moreover, the lane locations for the SOP markers, EOP markers, and CRC words are fixed and do not vary as a function of packet size. Because the lane locations used for the SOP markers, EOP markers, and CRC words in the lane allocation scheme of the present invention are fixed, both the transmitter and receiver circuitry know in advance where the SOP markers, EOP markers, and CRC words will be inserted into all data packets. It is therefore unnecessary to allocate circuit resources for handling different lane locations. This simplifies the transmitter circuitry used to insert the SOP markers, EOP markers, and CRC words. The receiver circuitry used to identify the SOP markers and EOP markers and used to extract the CRC words from the received data is also simplified.

The way in which packet contents are allocated to lanes varies depending on the number of lanes in the serial link. This is illustrated in connection with FIGS. 14, 15, 16, and 17, each of which shows how the trailing portion of an illustrative 17-word data packet is allocated among a serial link with a different number of lanes.

The example of FIG. 14 corresponds to a serial link with a single lane. As shown in FIG. 14, the data word D16, end-of-packet markers EOP and CRC words are transmitted in series. CRC words are transmitted immediately after the EOP markers. The lane position of the EOP markers and CRC words is fixed, because there is only a single lane.

The example of FIG. 15 corresponds to a two-lane serial link. In this situation, the two EOP markers are always placed next to one another in adjacent lanes. One EOP marker is allocated to the first lane and the other EOP marker is allocated to the second lane. An idle character IDL is inserted to ensure that the EOP markers are aligned with the leftmost lanes. Similarly, the two CRC words are always allocated to the first and second lanes, respectively. The SOP, EOP and CRC locations are fixed, because their lane locations do not change, regardless of packet size.

The example of FIG. 16 corresponds to a three-lane serial link. The SOP markers in this link (not shown) are inserted in the rightmost two lanes (i.e., the second and third lanes). An idle characters is allocated to the first lane before the SOP markers to ensure that the SOP markers are aligned with the last two lanes in the link. Idle characters are also inserted in the second and third lanes, so that the EOP markers are aligned with the leftmost lanes (i.e., the first and second lanes). The CRC codes follow immediately after the EOP markers, so in the scenario of FIG. 16, the CRC codes are allocated to the third lane and the first lane of the following column. IDL characters follow the CRC words in the second and third lanes, as shown in column C3 of FIG. 16.

A four-lane example is shown in FIG. 17. The SOP markers in this situation are allocated to the third and fourth lanes and are preceded by two IDL characters. The data allocated to the first lane of column C1 is accompanied by three lanes of idle characters. This ensures that the EOP markers are inserted into the leftmost (first and second) lanes of column C2. The CRC codes are adjacent to the EOP markers, so in the scenario of FIG. 17, the CRC codes are allocated to the third lane and fourth lane of the link.

As this set of examples demonstrates, in multi-lane arrangements, the SOP markers are always allocated to the rightmost (last two) lanes of the link and the EOP markers are always allocated to the leftmost (first two) lanes of the link. The CRC words follow the EOP markers. By configuring the circuitry in the data encapsulation circuit 152 to operate in this way, the locations of all markers and CRC words are fixed and known in advance, thereby easing the resource burden imposed on the circuit 110.

Figure 18:
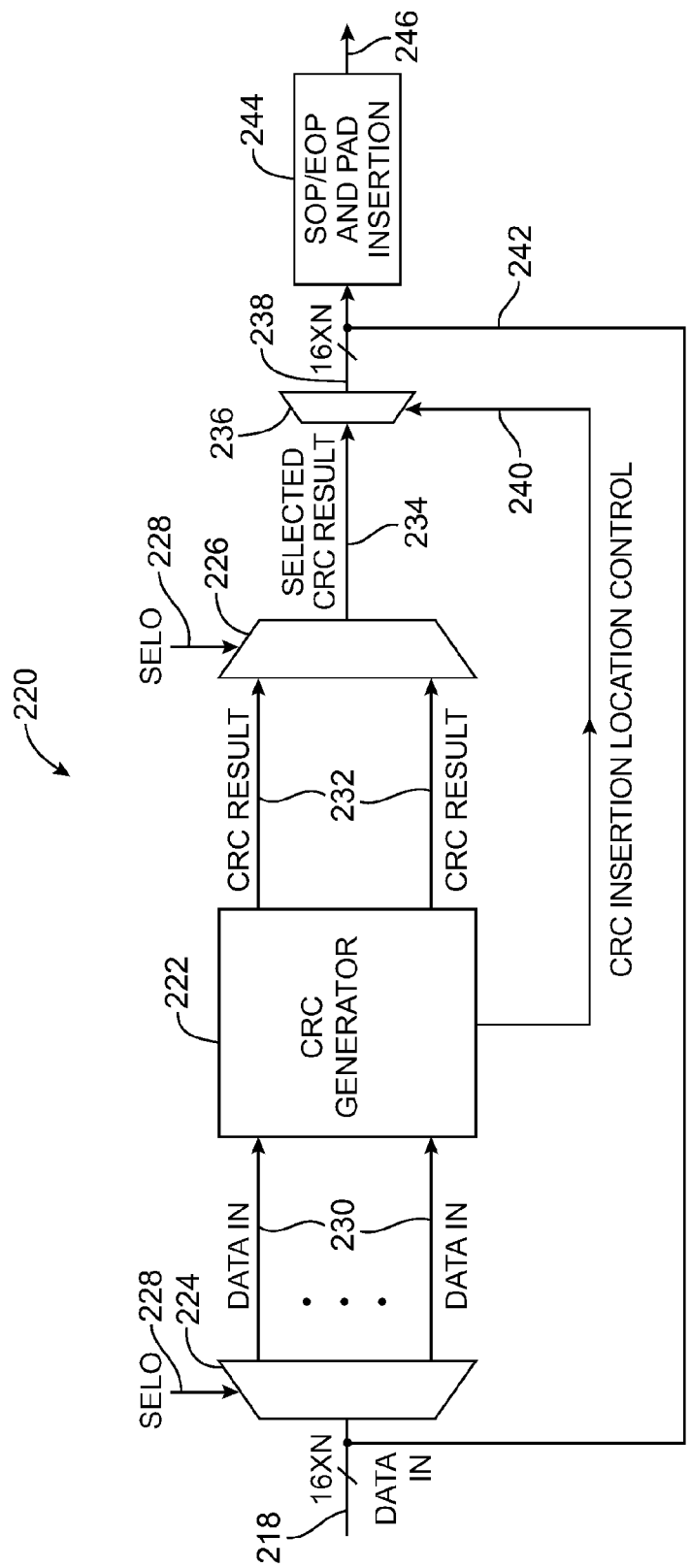
FIG. 18 is a diagram showing how a conventional serial communications link with multiple lanes uses a CRC generation arrangement at its transmitter in which multiple CRC results are computed by a CRC generator with multiplexers to accommodate various possible data word distribution patterns within the lanes.

FIG. 18 shows a conventional CRC computation arrangement used in the data encapsulation circuit of a programmable logic device integrated circuit supporting multi-lane serial link communications. CRC circuitry 220 of FIG. 18 has a data input 218 that receives data from a data buffer. The data that is received at input 218 is grouped in sets of data such as sets 212, 214, and 216 of FIG. 9 and potentially contains invalid words (shown as "Xs" in FIG. 9).

Because conventional lane allocation arrangements produce partially filled columns in the CRC coverage block as described in connection with FIG. 11, the circuitry 220 must include resources to accommodate multiple data word arrangements. In particular, circuitry 220 must include multiplexers 224 and 226. Multiplexers 224 and 226 are controlled by a signal SEL0 that is supplied to lines 228. The SEL0 signal is side band data that is received from the data buffer that feeds the data encapsulation circuit. The SEL0 signal informs multiplexers 224 and 226 of the identity of the invalid data words in the data received at input line 218. Multiplexer 224 clears the invalid data words in the incoming data (if any) and aligns the valid data in preparation for CRC computations by CRC generator 222 in response to the SEL0 signal.

Because of the presence of partially filled columns of the type shown in the illustrative CRC coverage block of FIG. 11, the circuitry 220 is configured to compute multiple CRC results. Only one of the CRC results will be appropriate for a given data arrangement, but CRC generator 222 must nevertheless include resources for generating each result.

Each of the different CRC results is output on a separate CRC result line 232. Multiplexer 226 is used to select the appropriate CRC result to include in the data packet based on the sideband data signal SEL0. The selected CRC result is applied to CRC insertion multiplexer 236 over path 234. CRC insertion multiplexer 236 is controlled by a CRC insertion location control signal received from CRC generator 222 over path 240. Path 242 is used to route the received data from input 218 to SOP/EOP and PAD insertion block 244. Before reaching block 244, the CRC insertion multiplexer 236 places the selected CRC result from line 234 onto bus 238 at the appropriate location. This process ensures that the CRC words for the data packet are inserted in the data packet in the appropriate lane location. SOP and EOP markers and PAD bytes are inserted at appropriate lane locations using circuitry 244. The data packet that has been constructed using circuitry 220 is supplied at output 246.

Figure 19:
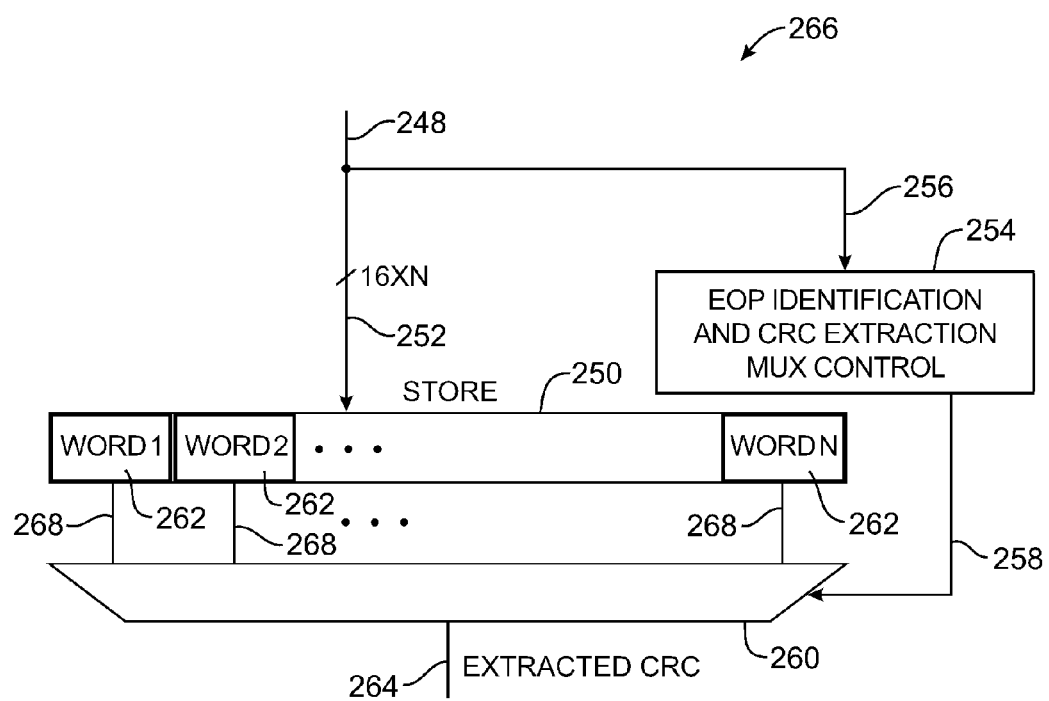
FIG. 19 is a diagram showing how a conventional serial communications link with multiple lanes uses a CRC generation arrangement at its receiver in which storage and multiplexer circuitry is used during end-of-packet identification and CRC extraction operations.

Conventional programmable logic device receiver circuitry 266 of the type that may be used in a lane stripping and packet processing circuit such as circuitry 186 of FIG. 6 is shown in FIG. 19. After a data packet has been formed using circuitry 220 of FIG. 18 and has been transmitted over a serial communications link, receiver circuitry 266 receives and processes the data packet. The receiver circuitry 266 receives the data packet from lane bonding circuitry using input path 248. Path 252 is used to distribute the received data to storage circuit 250. Path 256 is used to distribute the received data to EOP identification and CRC extraction multiplexer control circuitry 254.

In conventional data packets, the EOP markers and CRC words inserted by multiplexer 236 and insertion logic 244 of FIG. 18 appear in lane locations that depend on the size of the data packet. As an example, consider a four lane link. In some packets, the EOP markers may appear in the first and second lanes of the link, whereas in other packets the EOP markers may appear in the third and fourth lanes. The receiver circuitry 266 must be able to identify the EOP markers regardless of their lane locations. Similarly, the CRC words in some data packets might appear in the third and fourth lanes, whereas in other packets the CRC words might appear in the first and second lanes. Because circuitry 266 must handle all such possible scenarios, EOP identification and CRC extraction multiplexer control circuitry 254 is needed to identify the locations of the EOP markers and CRC words in the received data packet. Upon identifying the CRC location, the EOP identifying and CRC extraction multiplexer control circuitry

254 generates a control signal that is passed to CRC extraction multiplexer 260 via path 258.

The CRC extraction multiplexer 260 has multiple inputs 268, each of which receives a different word in the received data packet. Based on the control signal provided on path 258, the multiplexer 260 connects an appropriate input 268 to its output 264. The CRC words from the received data are routed from the input to the output of multiplexer 260 and are provided to data error correction circuitry for processing. In a typical scenario, data error correction circuitry computes a new version of the CRC words based on the received data words and compares the extracted CRC words to the newly-computed CRC words. If there is not an exact match, the data error correction circuitry can conclude that the data packet was corrupted during transmission and can take appropriate actions.

The storage unit 250 of conventional circuitry 266 is required because in some situations the CRC words may be received on an earlier clock cycle than the EOP markers. The storage unit 250 is used to recover these CRC words after the later-received EOP markers have been identified. The multiplexer 260 is required because the lane location of the CRC words is not fixed and therefore cannot be determined in advance.

Because conventional multi-lane serial communications links must handle partially-filled columns of data words as described in connection with FIG. 11 and do not insert CRC words and EOP markers in fixed locations, conventional transmitter-side circuitry such as CRC circuitry 220 of FIG. 18 and conventional receiver-side circuitry such as circuitry 266 of FIG. 19 consume a fairly large amount of circuit resources. Data encapsulation circuitry in accordance with the present invention is more efficient and eliminates the need for components such as multiplexers 224, 226, and 236 of FIG. 18 and the storage circuit 250, multiplexer control circuitry, and multiplexer 260 of FIG. 19.

Figure 20:
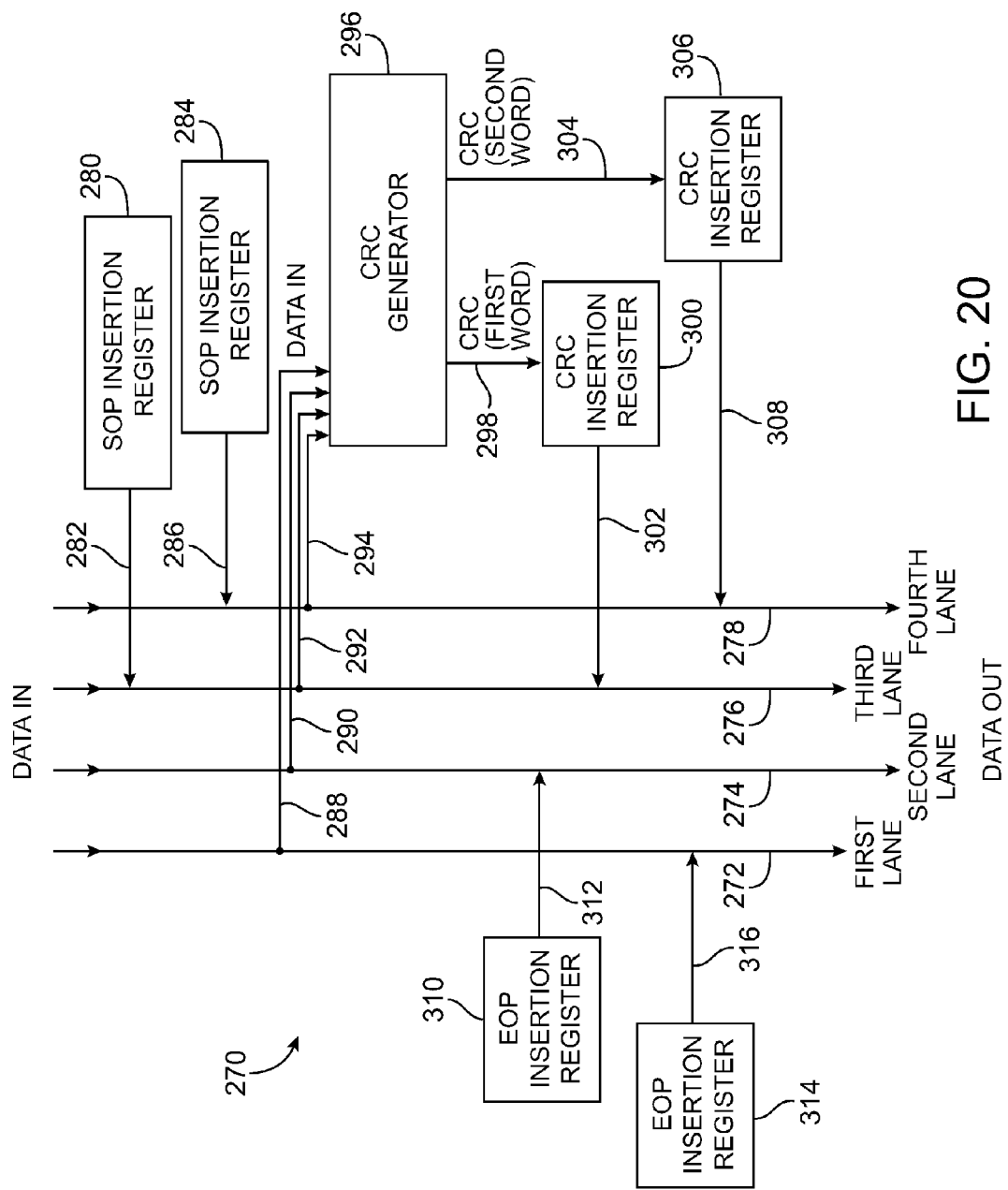
FIG. 20 is a diagram of serial communications link transmitter circuitry in which start-of-packet markers, end-of-packet markers, and CRC words are inserted into transmitted data at known fixed lane locations in a four-lane serial communications link in accordance with the present invention.
Figure 21:
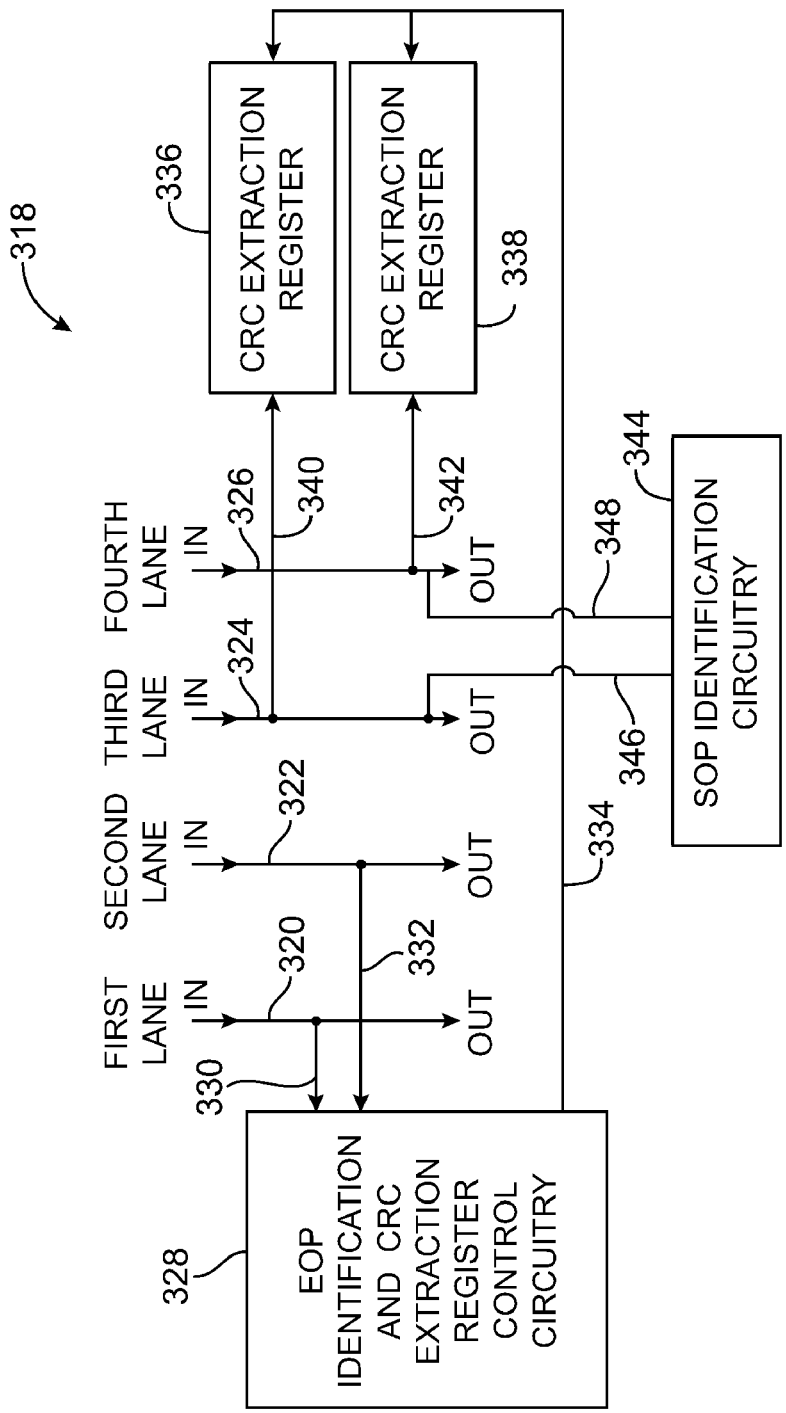
FIG. 21 is a diagram of serial communications link receiver circuitry in which end-of-packet markers are identified and CRC words are extracted from known lane locations in a four-lane serial communications link in accordance with the present invention.

Illustrative circuitry that may be implemented on programmable logic device integrated circuits that support multi-lane serial communications in accordance with the present invention is shown in FIGS. 20 and 21. The circuitry of FIGS. 20 and 21 may be implemented from programmable logic 32 based on a logic design created by computer-aided design tools 62 (FIG. 4). Fewer resources are consumed with the arrangements of FIGS. 20 and 21 than with conventional arrangements, because SOP and EOP markers and CRC words are allocated to fixed lane locations.

Circuitry 270 of the type shown in FIG. 20 is implemented within data encapsulation circuit 152 of FIG. 6. Four lanes of data are received at the DATA IN inputs to associated paths 272, 274, 276, and 278. The DATA OUT outputs of paths 272, 274, 276, and 278 are used to provide data to data path multiplexer 154 of FIG. 6.

Circuitry 270 includes SOP insertion register circuitry such as SOP insertion registers 280 and 284. SOP insertion register 280 inserts SOP makers into the third lane using path 282. The lane position at which the SOP markers are inserted is fixed, because register 280 is hardwired to path 276. Register 280 cannot insert SOP markers in other lanes (i.e., the first, second, or fourth lane in the example of FIG. 21), and thus does not require a lane location placement multiplexer. Similarly, the SOP insertion register 284 is dedicated to inserting SOP markers in the fourth lane of the serial communications link using path 286. With this type of arrangement, the SOP markers inserted by registers 280 and 284 are always inserted in the same lanes. The communications link of FIG. 20 has four lanes, so the SOP markers in the FIG. 20 example are always inserted in the third and fourth lanes. The fixed lane locations in which the SOP markers are inserted are shown in column C1 of the table of FIG. 12.

Circuitry 270 also includes EOP insertion register circuitry such as EOP insertion registers 310 and 314. EOP insertion register 310 inserts EOP markers into the first lane using path 312. EOP insertion register 314 inserts EOP makers into the second lane using path 316. The connections between the EOP insertion registers and the paths 272 and 274 are fixed, so the EOP markers are always inserted in the first and second lanes, and thus do not require a lane location placement multiplexer. The fixed lane locations in which the EOP markers are inserted are shown in column C7 of the table of FIG. 12.

The CRC generator 296 receives data words from path 272 using path 288, receives data words from path 274 via path 290, receives data words from path 276 via path 292, and receives data words from path 278 via path 294. The columns of data words on which CRC generator 296 operates to generate CRC codes are always complete. As shown by the illustrative columns C2-C6 in the CRC coverage block of FIG. 12, each set of data processed by CRC generator 296 either contains all data words (i.e., data words D4, D5, D6, and D7 in column C3) or contains data words and pad words (i.e., data word D16 and three pad words PAD in columns C6). None of the columns are of the partially filled type such as column C5 in the conventional arrangement of FIG. 11 (the pad words are encoded as zero's for the CRC generator). The CRC generator 296 can therefore calculate the CRC words for each data column using a relatively low-resource arrangement. In particular, each CRC computation performed by CRC generator 296 uses all of the words in that column, regardless of whether the words are data words or pad words (zeros).

The results produced by the CRC generator 296 are provided as data words. In the example of FIG. 20, two CRC bytes are generated by CRC generator 296. One CRC byte is provided to CRC insertion register 300 over line 298. The other CRC byte produced by generator 296 is provided to CRC insertion register 306 over path 304. The CRC registers 300 and 306 insert CRC information into the data packet at fixed lane locations, and therefore do not require a lane placement multiplexer. CRC register 300 is connected to the path 276 that is associated with the third lane by path 302. CRC register 306 is connected to the path 278 that is associated with the fourth lane by path 308.

With the circuitry 270 of FIG. 20, the connections between CRC registers 300 and 306 and the lanes in the serial link are fixed and do not change. The SOP and EOP registers also insert SOP and EOP markers into each packet at fixed locations. The use of fixed SOP, EOP, and CRC locations reduces the complexity of the data encapsulation circuitry by avoiding the need for multiplexers and CRC generation circuitry that handles partially filled columns.

The receiver circuitry used to process incoming packets is also made more efficient. Illustrative packet processing circuitry 318 that is used in the receiver of a programmable logic device integrated circuit in accordance with the present invention is shown in FIG. 21. Circuitry 318 is implemented within lane stripping and packet processing circuitry 186 of FIG. 21. Incoming data from lane bonding circuitry 182 is received on the ends of paths 320, 322, 324, and 326 that are labeled "IN." Packets that have been processed are provided to data buffer 176 through the ends of paths 320, 322, 324, and 326 that are labeled "OUT."

During packet processing, the packet data on each lane is examined to identify SOP and EOP markers. SOP identification circuitry 344 monitors incoming data packets on the third and fourth lanes of the link (in the four-lane example of FIG. 21). The SOP lane locations are known, because the locations of SOP insertion registers 280 and 284 of FIG. 20 are fixed. As a result, the SOP identification circuitry need only examine the same fixed lane locations when processing incoming data packets. SOP identification circuitry 344 uses path 334 to examine the data on the third lane and uses path 346 to examine data on the fourth lane.

The EOP identification and CRC extraction register control circuitry 328 monitors the incoming data packets from the serial links in the first and second lane positions. EOP identification and CRC extraction register control circuitry 328 is connected to path 320 by path 330 and is connected to path 322 by path 332. These connections are fixed, because the locations of the EOP insertion registers 310 and 314 of FIG. 20 are fixed. There is no need for logic to monitor the third and fourth lanes for EOP markers, because EOP markers are only inserted in the first two lanes of the link.

The EOP identification and CRC extraction control circuitry 328 controls the CRC extraction registers 336 and 338 using control path 334. During packet formation, EOP markers and CRC words are inserted into the packet in the same clock cycle, as illustrated by column C7 of FIG. 12. Accordingly, when EOP identification and CRC extraction register control identifies EOP markers in an incoming packet, a control signal is immediately passed to CRC extraction registers 336 and 338 over path 334. The control signal instructs CRC extraction register 336 to extract the currently-available CRC word from path 324 using path 340 and instructs CRC extraction register 338 to extract the currently-available CRC word from path 326 via path 342. It is not necessary to store the CRC words (using storage such as storage 250 of FIG. 19), because the CRC words can be extracted at the same time (during the same clock cycle) that the EOP markers are identified. Moreover, the CRC extraction registers 336 and 338 can be connected to fixed lane locations, because the lane locations from which the CRC words are to be extracted are known in advance. CRC words are inserted in the third and forth lanes using CRC insertion registers 300 and 306 of FIG. 20, so these words are extracted from the third and fourth lanes using CRC extraction registers 336 and 338 of FIG. 21.

As this discussion demonstrates, the packet encapsulation circuitry of FIG. 20 does not require multiplexers for inserting markers and CRC words in different locations for different packets, because EOP insertion registers 310 and 314, SOP insertion registers 280 and 284, and CRC insertion registers 300 and 306 make data packet insertions at fixed lane locations. The packet processing circuitry of FIG. 21 also does not require multiplexing circuitry to extract CRC codes and markers, because this information is retrieved from the received data packets at fixed lane locations. As a result, the circuitry of FIG. 20 and FIG. 21 is implemented more efficiently (i.e., using fewer programmable logic device integrated circuit resources) than conventional data packet encapsulation and packet processing circuits.

Figure 22:
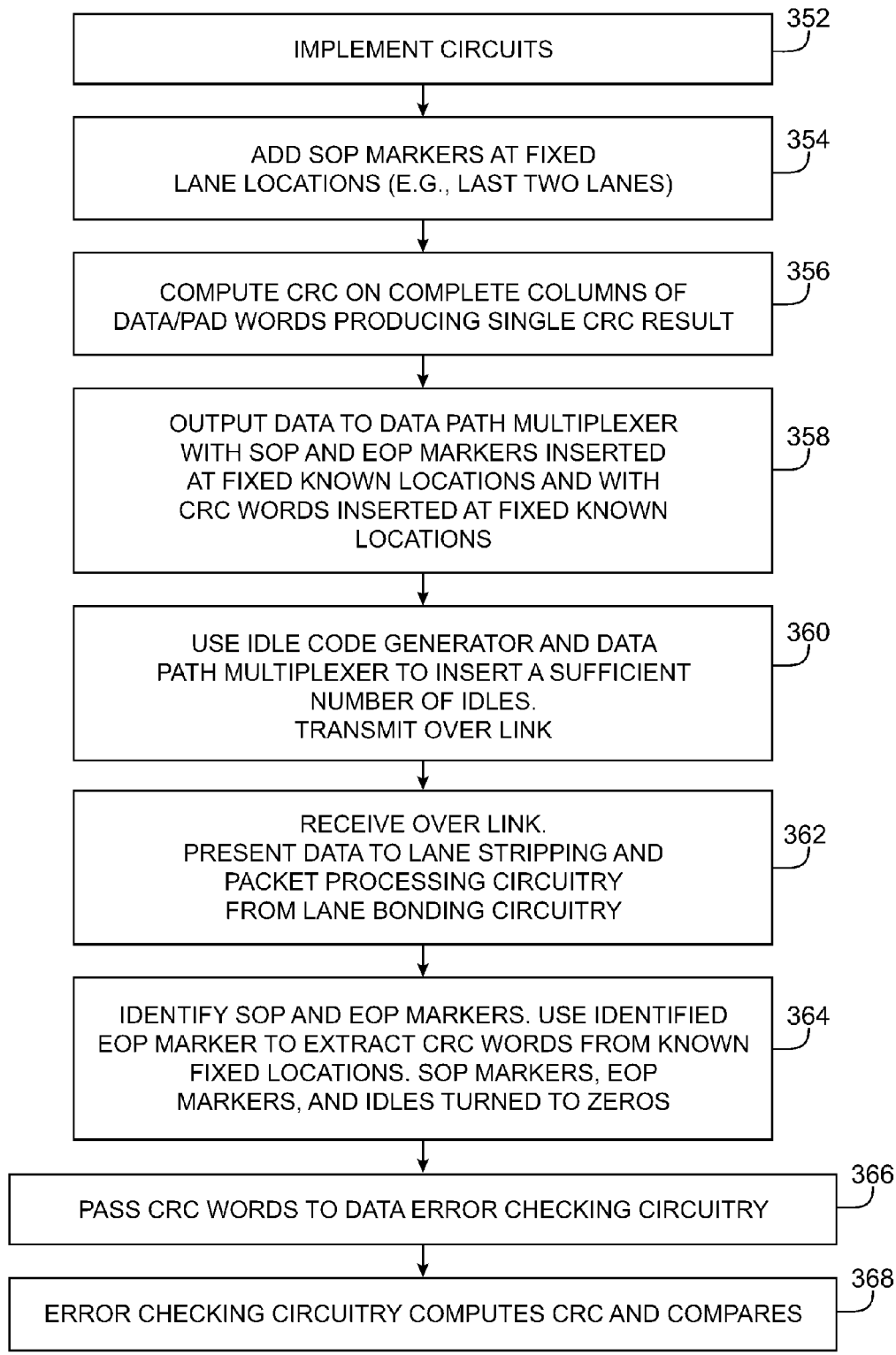
FIG. 22 is a flow chart of illustrative steps involved in transmitting and receiving packetized data in an serial communications link in accordance with the present invention.

Illustrative operations involved in communicating over multi-lane serial links in accordance with the present invention are shown in FIG. 22. At step 352, a logic designer implements the data encapsulation circuit 152 of FIG. 6 and the lane stripping and packet processing circuitry 186 of FIG. 6 and other circuitry of the type shown in FIG. 6 on integrated circuits such as integrated circuit A and integrated circuit B of FIG. 1. The logic designer may use CAD tools such as CAD tools 62 of FIG. 4 to create circuits of the type described in connection with FIGS. 20 and 21. After configuration data has been loaded into the programmable logic device integrated circuits, the programmable logic device integrated circuits may be installed in a system. If desired, circuits such as the circuits of FIGS. 20 and 21 may be implemented using hardwired circuitry on integrated circuits other than programmable logic device integrated circuits.

Following step 352, the integrated circuits may be used in a system. During data transmission, packets of data are formed using data encapsulation circuit 152 (FIG. 6), idle code generator 162, and data path multiplexer 154. During processing of received data packets, lane stripping and packet processing circuitry 186 extracts data words and CRC words from received packets. Extracted data words are passed to data buffer 176 over path 188. Extracted CRC words are passed to data error checking circuitry 190.

Steps involved in data transmission include steps 354, 356, 358, and 360 of FIG. 22. Steps involved in processing received data include steps 362, 364, 366, and 368 of FIG. 22.

At step 354, SOP markers are inserted into outgoing data packets at fixed lane locations, using SOP insertion registers 280 and 284 of FIG. 20.

At step 356, the CRC generator 296 of FIG. 21 computes the CRC of the data words in each column. The CRC is computed only on complete columns (i.e., columns filled with data words or columns filled with data words and pad words). In columns with pad words, the pad words are included in the CRC computation of step 356 encoded as zeros. Because only a single type of CRC computation is performed (i.e., a computation using all words in each column), only a single CRC result (e.g., two CRC words) is produced during step 356.

At step 358, the EOP markers and CRC words are inserted in the data packet. The EOP markers and CRC words are inserted at fixed lane locations. The data packet including the inserted SOP markers, EOP markers, and CRC words is provided to data path multiplexer 154.

At step 360, the data path multiplexer 154 inserts idle codes IDL from idle code generator 162 into the data packet, as described in connection with FIG. 14.

At step 362, the data packet is transmitted from one integrated circuit over the serial link 14 and is received at another integrated circuit. The data that has been received is presented to a lane stripping and packet processing circuit 186, using lane bonding circuitry 182 (FIG. 6).

At step 364, the lane stripping and packet processing circuitry 186 uses circuitry 318 of FIG. 22 to process the received packet. SOP and EOP markers are identified using SOP identification circuitry 344 and EOP identification circuitry 328. CRC words are identified based on the identified EOP markers and are extracted from their fixed lane locations. The SOP markers, EOP markers, and IDL characters are removed from the packet and zeros (PADs) are inserted in preparation for new CRC computations by data error checking circuitry 190.

At step 366, the padded data words are also passed to data error checking circuitry 190. The CRC words that have been extracted from the data packet are also passed to data error checking circuitry 190 (e.g., on a sideband bus).

At step 368, the data error checking circuitry computes new CRC words using the received data words and compares the newly-computed CRC words to the extracted CRC words to determine whether a transmission error has occurred. If an error has occurred, the data packet may be retransmitted or other suitable actions may be taken. The data words that have been extracted from the packet are passed to data buffer 176.

Figure 23:
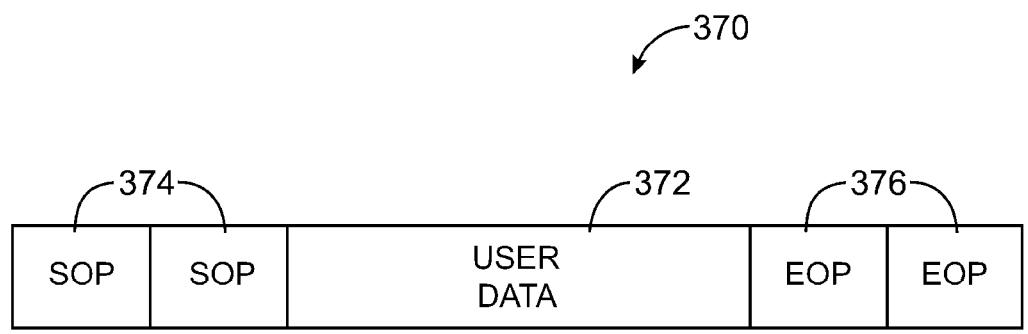
FIG. 23 is a data diagram showing a typical regular data packet constructed in accordance with the present invention.

The present invention provides efficient CRC computation when handling nested data packets. In a typical scenario, data buffer 144 receives both regular and priority port data from logic 112 (FIG. 6). Data transmitted using the priority port will take precedence over data being transmitted using the regular data port. As a result, priority data packets will be nested within regular data packets when regular and priority data is available for transmission at the same time. A regular data packet 370 is shown in FIG. 23. Packet 370 has a data payload 372 encapsulated between SOP markers 374 and EOP markers 376. When it is desired to transmit priority data over link 14 (e.g., data that is needed to control an important system function), logic circuitry 112 can send that data to the priority port.

Priority data is encapsulated in a packet and is transmitted over the link 14. Because priority data takes precedence over regular data, the normal transmission of the regular data packet is temporarily interrupted by the transmission of the priority data packet. This results in the priority data packet becoming nested within the regular data packet 370.

Figure 24:
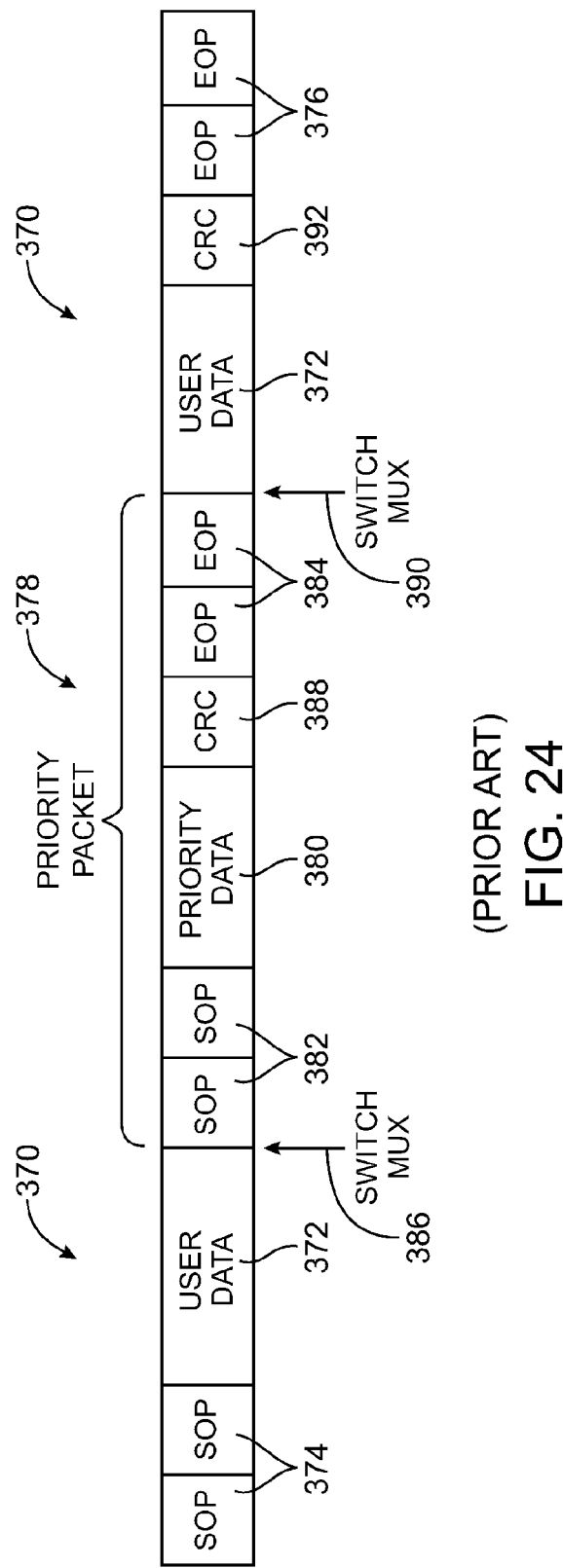
FIG. 24 is a data diagram showing how a priority packet may be nested within a regular data packet in a conventional serial communications link.

A conventional priority packet nesting scheme is shown in FIG. 24. A conventional priority data packet 378 includes a priority data payload 380 that has been encapsulated between priority data packet SOP markers 382 and priority data packet EOP markers 384. The packet 378 breaks the regular data packet data payload 372 into two portions.

The conventional nesting scheme can create complications when calculating CRC words. To handle nested situations, conventional CRC circuitry is provided with two CRC generators and associated multiplexing circuitry. Initially, the multiplexing circuitry is adjusted to route the normal data into a first CRC generator. At the point in time indicated by line 386, the multiplexing circuitry must be switched, so that the priority port data is routed to a second CRC generator. After the CRC words 388 for the priority data packet have been generated and inserted into the priority data packet, as shown in FIG. 24, the multiplexer is switched back to its original configuration, as indicated by line 390. This routes the remainder of the user data 372 into the first CRC generator and allows the first CRC generator to finish computing the CRC words 392 for the regular user data 372. The CRC words for the regular data are then inserted into the regular data packet as shown in FIG. 24.

In accordance with the present invention, only a single CRC generator is used. Rather than pausing the processing of the CRC word generation for the regular data when priority data is received, the CRC word generation for the regular data is completed and inserted after the Suspend marker. Suspend markers are used to denote the end of the first portion of the regular data packet. After the priority data packet has been processed and its own CRC words generated, continuation markers are inserted to indicate the start of the second portion of the regular data packet. Because the suspend and continuation markers mark the end and start of the first and second portions of the regular data packet, these markers also serve to denote the location of the nested priority packet. Following computation of the CRC for the priority data packet, CRC computations are performed on the second portion of the regular data packet. A set of CRC words corresponding to the second portion of the regular data packet is inserted into the second portion of the regular data packet adjacent to end-of-packet markers for the regular data packet. By handling CRC calculations separately for the first portion of the regular data packet, the priority data packet, and the second portion of the regular data packet, CRC computations may be performed using a single CRC generator. This eliminates the need to store context for interrupted regular data packet CRC calculations and eliminates the need for multiplexing circuitry and multiple CRC generators as required with conventional arrangements.

Figure 25:
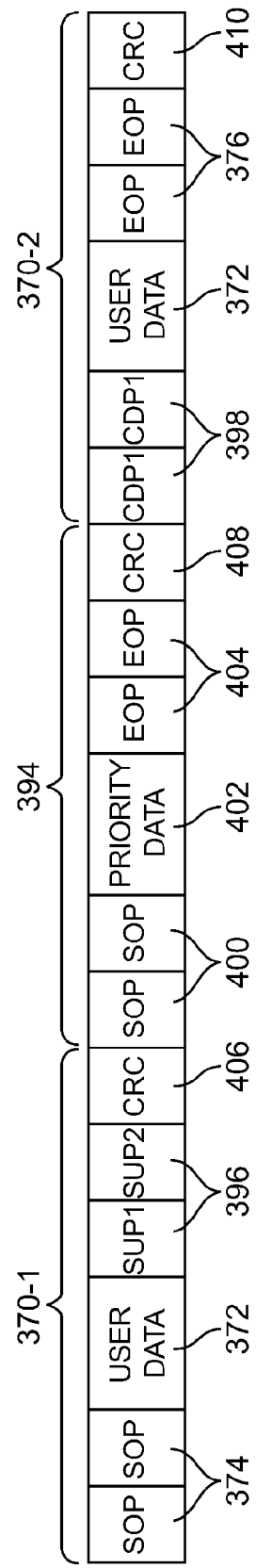
FIG. 25 is a data diagram showing how a priority packet may be nested within a regular data packet in a serial communications link in accordance with the present invention.

A data packet of the type shown in FIG. 23 following insertion of a priority data packet using the nesting scheme of the present invention is shown in FIG. 25. With this scheme, when the regular data packet is interrupted by a priority data packet 394, the regular data packet is divided into two portions—first portion 370-1 and second portion 370-2. Suspend markers 396 (SUP) are inserted into the first portion 370-1 to mark its end. Continuation markers 398 (CDP) are inserted into the second portion 370-2 to mark its start. Priority packet 394 has priority packet SOP markers 400, priority data 402, and priority packet EOP markers 404. The suspend and continuation markers 396 and 398 are distinct from the SOP and EOP markers used for the regular and priority data packets.

A single CRC generator is used to compute CRC words for the first regular data packet portion 370-1, the priority packet 394, and the second regular data packet portion 370-1. The CRC words 406 for the first regular data packet portion 370-1 are inserted in portion 370-1 immediately following the suspend packets 396. The CRC words 408 for the priority packet 394 are inserted immediately after the EOP markers 404. The CRC words 410 for the second portion 370-2 are inserted after the EOP markers 376.

Figure 26:
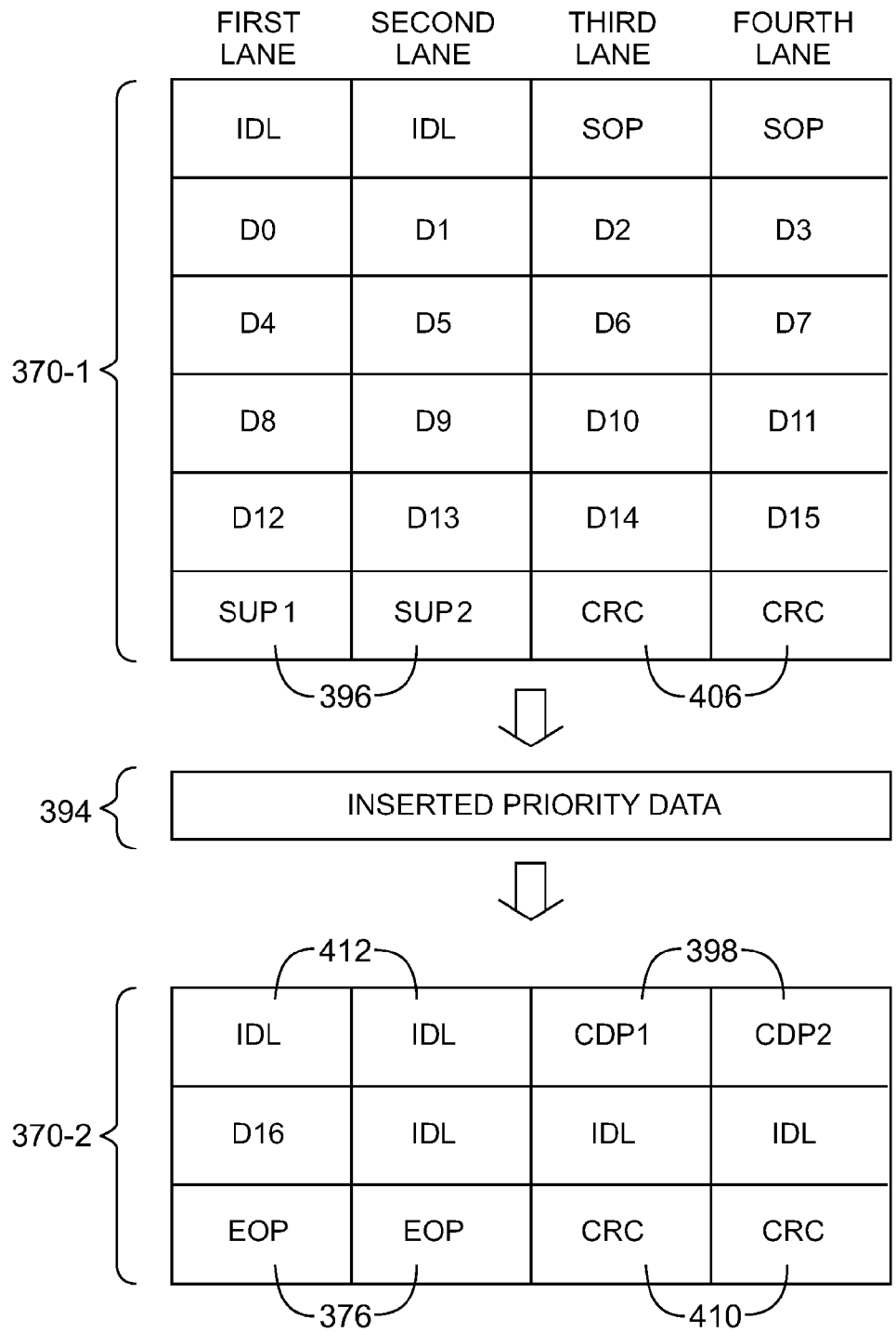
FIG. 26 is a data diagram showing the lane locations at which suspend and continue markers may be inserted into transmitted data when a priority data packet is nested within a regular data packet in a serial communications link in a four-lane serial communications link in accordance with the present invention.

The suspend marker and continuation marker scheme is illustrated further using the CRC coverage block diagram of FIG. 26. As shown in FIG. 26, the suspend markers 396 are inserted in the first two lanes of the link (the first and second lanes in this four-lane example) and CRC words 406 are inserted in the last two lanes of the link (the third and fourth lanes).

The lane allocation scheme for the priority packet 394 is the same as for a regular data packet.

In the second portion 370-2 of the regular data packet, idle characters 412 are inserted in the first two lanes and continuation markers 398 (CDP) are inserted into the second two lanes. The EOP markers denoting the end of the regular data packet are allocated to the first and second lanes. The CRC words 410 corresponding to the second portion 370-2 are inserted in the last two lanes.

As shown in FIG. 26, the suspend and continuation markers and the CRC words for each section of data are inserted at fixed lane locations, as described in connection with the SOP markers, EOP markers, and CRC words of FIGS. 12 and 13. The efficiency of the insertion and extraction functions and circuitry described in connection with FIGS. 12 and 13 and FIGS. 20 and 21 are therefore maintained.

Figure 27:
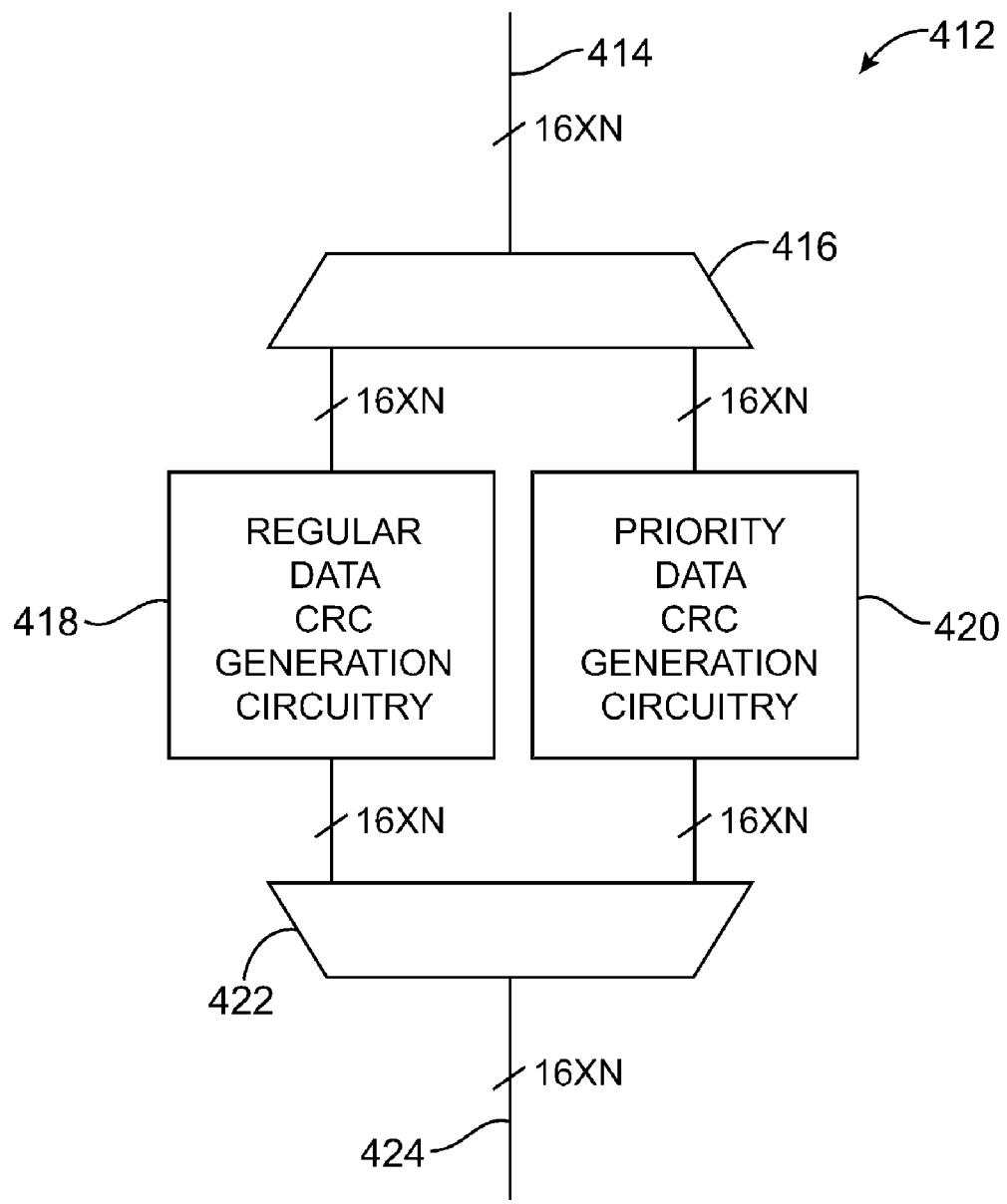
FIG. 27 is a circuit diagram showing how conventional serial communications links with regular and priority ports use two respective CRC generators to handle CRC computations for transmitted data.

Moreover, the resource burden imposed for CRC generation is reduced. A conventional CRC computational scheme is shown in FIG. 27. Using CRC circuitry 412, incoming data for regular and priority packets is presented to input 414. Following CRC operations, corresponding output data is presented at output 424. Multiplexers 416 and 422 are actively controlled depending on whether regular data or priority data is being processed. There are two separate CRC generators. Generator 418 is used to perform CRC computations for regular (user) data. Generator 420 is used to perform CRC computations for priority data. With conventional schemes, regular data is directed into generator 418. When a priority data packet interrupts the flow of regular data, the operation of generator 418 is suspended and context for the pending CRC computation on the regular data is retained. Multiplexers 416 and 422 are switched to route the data into generator 420. The generator 420 computes the CRC words for the priority data. After the priority data packet has been processed, the multiplexers 416 and 422 are switched back to their initial configuration, so that the remainder of the regular data can be used to finish the pending CRC computations for the regular data packet.

The type of arrangement shown in FIG. 27 requires multiple CRC generators and multiplexing circuitry. Circuit resources must also be used to maintain proper context when pausing the CRC operations on the regular data.

Figure 28:
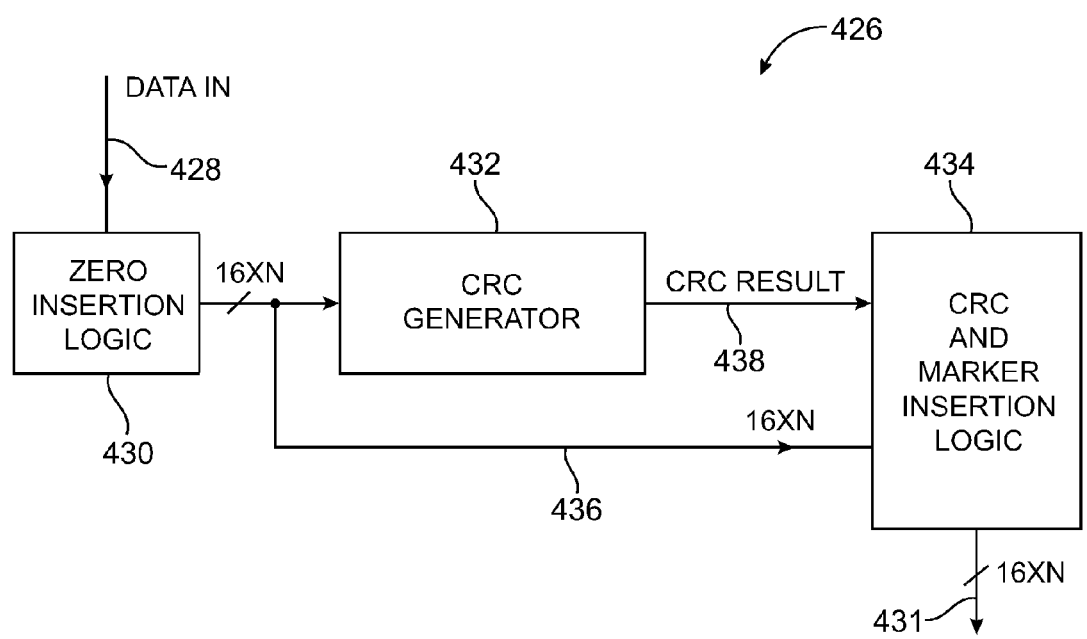
FIG. 28 is a circuit diagram showing how a single CRC generator may be used to handle both regular and priority port data in accordance with the present invention.

CRC processing circuitry that may be used in accordance with the present invention is shown in FIG. 28. Data for which a CRC is to be generated is provided at input 428. CRC generator 432 generates a CRC result (e.g., two CRC words) on line 438, following zero insertion (PAD words) by zero insertion logic 430. The data on input 428 is routed to output 431 using path 436. At appropriate lane locations, CRC, SOP (or Continue), and EOP (or Suspend) insertion logic 434 inserts the CRC result on line 438 into the data provided on output 431.

Only a single CRC generator 432 is required in the circuitry 426 of FIG. 28, because CRC words are computed separately for the first and second portions of the regular data packet and for the priority data packet. The circuitry 426 of FIG. 28 may be used as part of a transmitter (e.g., in data encapsulation circuit 152). Logic 434 is used to insert CRC words and the markers described in connection with FIG. 25 into outgoing data at fixed lane locations. A similar arrangement may be used on the receiving end of a serial communications link (e.g., in circuitry 186 and 190) by replacing logic 434 with marker identification logic that identifies SOP markers, EOP markers, suspend markers, and continuation markers and with CRC extraction circuitry of the type described in connection with FIG. 21.

Figure 29:
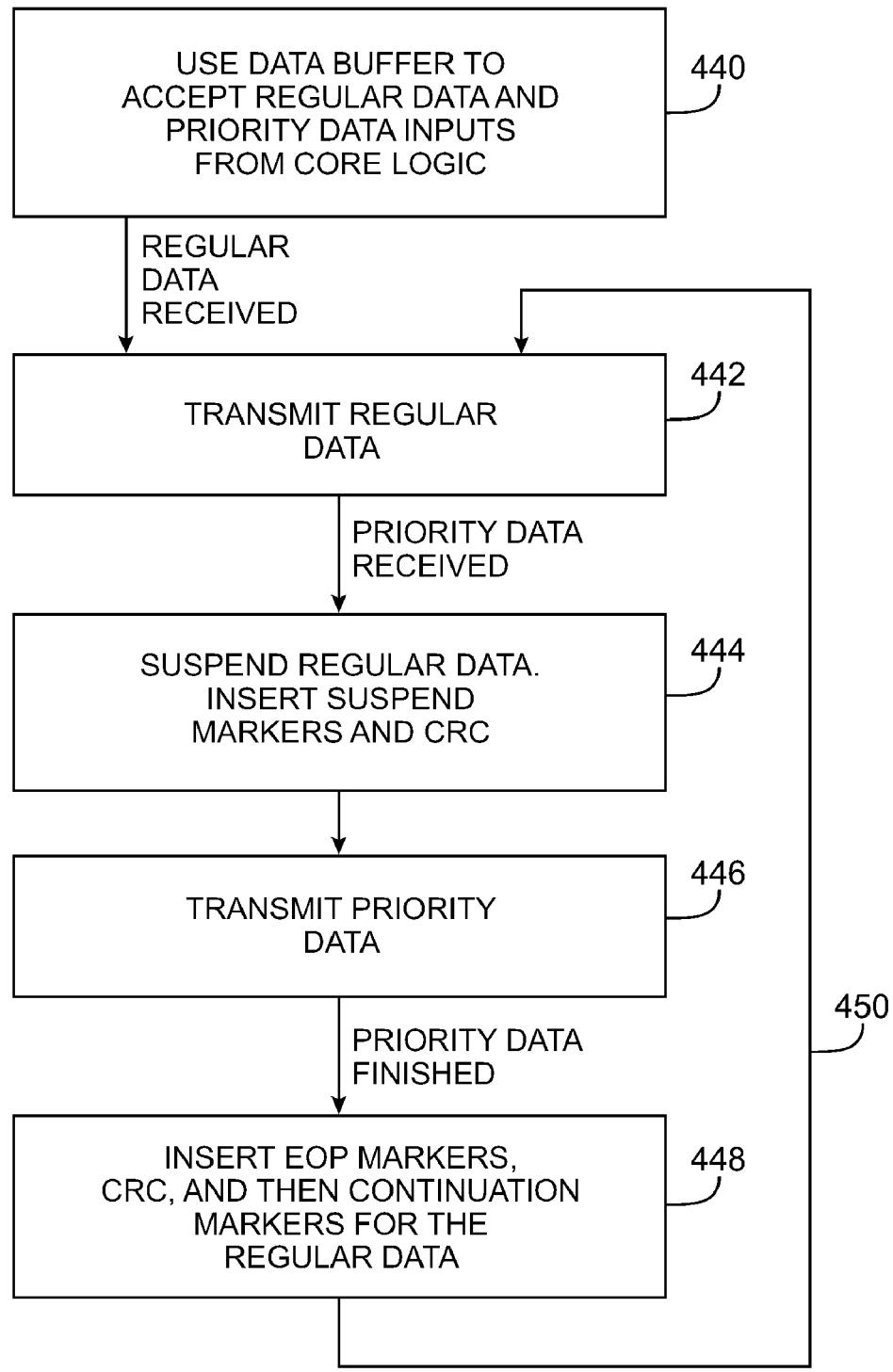
FIG. 29 is a flow chart of illustrative steps involved in handling regular and priority port CRC computations in a serial communications link in accordance with the present invention.

Illustrative steps involved in handling CRC computations for regular and priority data are shown in FIG. 29.

At step 440, regular and priority data is generated by logic 112 and transmitted through data buffer 144 for transmission over serial link 14.

When regular data is received, a first portion of the regular data packet is transmitted (step 442). If priority data is received, the transmission of the regular data is suspended. The single CRC generator 432 (FIG. 28) computes the CRC words corresponding to the first portion of the regular data and inserts these CRC words immediately following suspend markers for the first regular data portion (step 444).

The priority data is transmitted at step 446 (including CRC words that have been computed and inserted by the circuitry of FIG. 28).

When the priority data packet is complete, continuation markers are inserted to denote the beginning of a second portion of the user data. Following CRC computations on the second portion of the regular data, EOP markers are inserted to denote the completion of the regular data packet and the CRC words for the second portion of the regular data are inserted (step 448). Processing then loops back to step 442, as indicated by line 450.

It should also be noted that channel multiplexing in the conventional scheme must only occur on packet boundaries (e.g., address change could only happen on SOP) In the present invention, the use of Suspend and Continues are valid for both regular data and priority data, meaning segments or bursts with different addresses can be transmitted and received (and individually protected by CRC).

The foregoing is merely illustrative of the principles of this invention and various modifications can be made by those skilled in the art without departing from the scope and spirit of the invention.

What is claimed is:

1. A method of communicating data between first and second integrated circuits over a serial communications link having multiple lanes, the method comprising:
   generating data words to be transmitted using logic on the first integrated circuit;
   forming data packets from the data words by allocating the data words among the multiple lanes of the link;
   inserting cyclic redundancy check words into the data packets at fixed lane locations within the multiple lanes; and
   transmitting the data packets including the inserted cyclic redundancy check words to the second integrated circuit from the first integrated circuit over the serial communications link.

2. The method defined in claim 1 further comprising:
   inserting end-of-packet markers into the data packets at fixed lane locations within the multiple lanes before transmitting the data packets to the second integrated circuit.

3. The method defined in claim 1 wherein inserting the cyclic redundancy check words further comprises:
   inserting the cyclic redundancy check words into the data packets at fixed lane locations adjacent to end-of-packet markers within the multiple lanes before transmitting the data packets to the second integrated circuit.

4. The method defined in claim 1 wherein the lanes of the serial communications link include a first lane and a last lane and wherein inserting the cyclic redundancy check words further comprises:
   inserting the cyclic redundancy check words into the data packets at a fixed lane location that starts with the first lane before transmitting the data packets to the second integrated circuit.

5. The method defined in claim 1 further comprising:
   computing the cyclic redundancy check words for the data packets, wherein each cyclic redundancy check computation is performed without using multiplexers and produces a single cyclic redundancy check result.

6. The method defined in claim 1 wherein the lanes of the serial communications link include a first lane and a last lane, the method further comprising:
   computing the cyclic redundancy check words for the data packets, wherein each cyclic redundancy check computation is performed without using multiplexers and produces a single cyclic redundancy check result, wherein inserting the cyclic redundancy check words comprises inserting the cyclic redundancy check words into the data packets at a fixed lane location that starts with the first lane before transmitting the data packets to the second integrated circuit.

7. The method defined in claim 1 wherein the lanes of the serial communications link include a first lane and a last lane, the method further comprising:
   inserting end-of-packet markers and start-of-packet markers into the data packets at fixed lane locations within the multiple lanes before transmitting the data packets to the second integrated circuit, wherein the fixed lane locations at which the start-of-packet markers are inserted include the last lane and wherein the fixed lane locations at which the end-of-packet markers are inserted include the first lane.

8. The method defined in claim 1 wherein there are a given number of the lanes in the serial communications link, wherein sets of words are allocated across the lanes prior to transmission to the second integrated circuit to form columns of words, each column of words containing a number of words that is equal to the given number, the method further comprising:
   computing the cyclic redundancy check words using complete columns that contain only data words or that contain only data words and pad words.

9. The method defined in claim 1 wherein transmitting the data packets comprises transmitting the data in priority data packets and regular data packets, the method further comprising:
   transmitting suspend markers and continue markers that denote where the priority data packets are nested within the regular data packets.

10. The method defined in claim 1 wherein transmitting the data packets comprises transmitting the data in priority data packets and regular data packets, the method further comprising:
   transmitting suspend markers and continue markers that denote where the priority data packets are nested within the regular data packets, wherein each priority data packet that is inserted within a regular data packet divides that regular data packet into a first regular data packet portion and a second regular data packet portion; and
   performing separate complete cyclic redundancy check computations on first regular data packet portion and the second regular data packet portion.

11. The method defined in claim 1 wherein transmitting the data packets comprises transmitting the data in priority data packets and regular data packets, the method further comprising:
   inserting suspend markers and continue markers into the data that denote where the priority data packets are nested within the regular data packets, wherein each priority data packet that is inserted within a regular data packet divides that regular data packet into a first regular data packet portion and a second regular data packet portion;
   computing at least one first cyclic redundancy check word for the first regular data packet portion and at least one second cyclic redundancy check word for the second regular data packet portion;
   inserting the first cyclic redundancy check word in the first regular data packet portion in a lane location that is adjacent to an inserted suspend marker before transmitting the first regular data packet portion; and
   inserting the second cyclic redundancy check word in the second regular data packet portion in a lane that is adjacent to the end-of-packet marker for the regular data packet before transmitting the second regular data packet portion.

12. The method defined in claim 1 wherein transmitting the data packets comprises transmitting the data in priority data packets and regular data packets, the method further comprising:
   inserting suspend markers and continue markers into the data that denote where the priority data packets are nested within the regular data packets, wherein each priority data packet that is inserted within a regular data packet divides that regular data packet into a first regular data packet portion and a second regular data packet portion;
   computing at least one first cyclic redundancy check word for the first regular data packet portion and at least one second cyclic redundancy check word for the second regular data packet portion;
   inserting the first cyclic redundancy check word in the first regular data packet portion in a lane location that is adjacent to an inserted suspend marker;
   inserting the second cyclic redundancy check word in the second regular data packet portion in a lane location that is adjacent to an end-of-packet marker for the regular data packet;
   computing at least one third cyclic redundancy check word corresponding to the priority data packet; and
   inserting the third cyclic redundancy check word in the priority data packet adjacent to one of the continuation markers.

13. A method of communicating data between first and second integrated circuits over a serial communications link having multiple lanes, the method comprising:
   generating data words to be transmitted using logic on the first integrated circuit;
   forming regular data packets from the data words by inserting start-of-packet and end-of-packet markers into the data at fixed lane locations in the serial communications link;
   nesting priority data packets formed from the data words within the regular data packets, wherein nesting the priority packets includes inserting suspend and continuation markers that are distinct from priority packet start-of-packet markers and priority packet end-of-packet markers into the data to denote where priority data packets are nested within the regular data packets and wherein inserting the suspend and continuation markers includes inserting the suspend and continuation markers at fixed lane locations;
   computing cyclic redundancy check words for the regular data packets and the priority data packets using a single cyclic redundancy check generator;
   inserting the cyclic redundancy check words into the data packets; and
   transmitting the data packets including the inserted cyclic redundancy check words to the second integrated circuit over the serial communications link.

14. The method defined in claim 13 wherein forming the data packets comprises inserting some of the cyclic redundancy check words into the regular data packets adjacent to the inserted suspend markers.

15. The method defined in claim 13 wherein forming the data packets comprises inserting some of the cyclic redundancy check words into the regular data packets adjacent to the end-of-packet markers.

16. The method defined in claim 13 wherein forming the data packets comprises inserting some of the cyclic redundancy check words into the priority data packets adjacent to the continuation markers.

17. An integrated circuit that transmits data to another integrated circuit over a serial communications link having multiple lanes, the integrated circuit comprising:
   core circuitry that produces data words to be transmitted over the serial communications link; and
   output circuitry that transmits the data words over the multiple lanes in the serial communications link in the form of data packets, wherein each of the multiple lanes corresponds to a path in the output circuitry;
   a single cyclic redundancy check generator in the output circuitry that computes cyclic redundancy check words for the data packets; and
   at least one cyclic redundancy check insertion register that is connected to a given one of the paths in a fixed lane location, wherein the cyclic redundancy check generator provides the cyclic redundancy check words to the cyclic redundancy check register without multiplexing circuitry so that the cyclic redundancy check words are inserted into the data packets at the fixed lane location.

18. The integrated circuit defined in claim 17 further comprising an end-of-packet insertion register that is connected to one of the paths in a fixed lane location that is different from the fixed lane location at which the cyclic redundancy check insertion register is connected.

19. The integrated circuit defined in claim 17 further comprising a start-of-packet insertion register that is connected to the given one of the paths to which the cyclic redundancy check insertion register is connected.

20. The integrated circuit defined in claim 17 further comprising:
- programmable elements that are loaded with configuration data and that produce corresponding static output signals;
- programmable logic in the core circuitry that is configured by the output signals;
- an end-of-packet insertion register that is connected to one of the paths in a fixed lane location that is different from the fixed lane location at which the cyclic redundancy check insertion register is connected; and
- a start-of-packet insertion register that is connected to the given one of the paths to which the cyclic redundancy check insertion register is connected.

\* \* \* \* \*